(12) United States Patent
Hirai et al.

(10) Patent No.: US 9,202,264 B2
(45) Date of Patent: Dec. 1, 2015

(54) IMAGE PROCESSING APPARATUS AND IMAGE PROCESSING METHOD

(71) Applicant: FUJITSU LIMITED, Kawasaki-shi, Kanagawa (JP)

(72) Inventors: Yukio Hirai, Akashi (JP); Hiroyasu Yoshikawa, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 13/900,875

(22) Filed: May 23, 2013

(65) Prior Publication Data

US 2013/0343651 A1    Dec. 26, 2013

(30) Foreign Application Priority Data

Jun. 20, 2012  (JP) ................................. 2012-139086

(51) Int. Cl.
| | | |
|---|---|---|
| G06K 9/34 | (2006.01) | |
| G06T 5/00 | (2006.01) | |
| G06T 5/20 | (2006.01) | |
| H04N 17/00 | (2006.01) | |

(52) U.S. Cl.
CPC . G06T 5/003 (2013.01); G06T 5/20 (2013.01); H04N 17/002 (2013.01); *G06T 2207/20012* (2013.01)

(58) Field of Classification Search
None
See application file for complete search history.

(56) References Cited

U.S. PATENT DOCUMENTS

| 5,526,446 A * | 6/1996 | Adelson et al. ............... 382/275 |
|---|---|---|
| 2006/0204861 A1 * | 9/2006 | Ben-Eliezer et al. .............. 430/5 |
| 2012/0002085 A1 * | 1/2012 | Sekine .......................... 348/241 |
| 2012/0105649 A1 * | 5/2012 | Okada ........................... 348/175 |
| 2012/0141027 A1 * | 6/2012 | Hatakeyama et al. ......... 382/167 |
| 2013/0083205 A1 * | 4/2013 | Gamadia et al. .............. 348/188 |
| 2013/0136355 A1 * | 5/2013 | Demandolx ................... 382/167 |
| 2014/0226915 A1 * | 8/2014 | Fujita et al. ................... 382/264 |

FOREIGN PATENT DOCUMENTS

JP          2012-23498           2/2012

* cited by examiner

*Primary Examiner* — Utpal Shah
*Assistant Examiner* — Narek Zohrabyan
(74) *Attorney, Agent, or Firm* — Oblon, McClelland, Maier & Neustadt, L.L.P.

(57) ABSTRACT

An image processing apparatus includes: a processor coupled to a memory, configured to: perform an analysis of resolution in at least two directions of an image which is taken from a subject having a radial pattern, and determine filter data containing an adjusted weight coefficient which is obtained by adjusting a weight coefficient in one of the two directions, whichever has lower resolution, based on a result of the analysis of the image corrected by filtering on the image in accordance with a blurring function of the image.

17 Claims, 43 Drawing Sheets

FIG. 36

| POSITION | INVERSE FILTER |
|---|---|
| $(x_1, y_1)$ | FIL1 |
| $(x_2, y_2)$ | FIL2 |
| ⋮ | ⋮ |

«IMAGE PROCESSING APPARATUS AND IMAGE PROCESSING METHOD»

IMAGE PROCESSING APPARATUS AND IMAGE PROCESSING METHOD

CROSS-REFERENCE TO RELATED APPLICATION

This application is based upon and claims the benefit of priority of the prior Japanese Patent Application No. 2012-139086, filed on Jun. 20, 2012, the entire contents of which are incorporated herein by reference.

FIELD

The embodiments discussed herein are related to an image processing apparatus and an image processing method.

BACKGROUND

In an image taken by a digital camera or the like, resolution on a periphery of the image has often been reduced. The resolution on the periphery of the image tends to be reduced as compared to the resolution in the optical axis central part due to aberration of a lens optical system and the dependence of an aperture size on an angle of view. One of the causes of this reduction is aperture vignetting. In a portion with a wide angle of view, vignetting occurs in an aperture in a radial direction and causes the aperture to be elliptic, which causes blurring. This reduces the resolution in a radial direction.

To deal with such a reduction in resolution, there is, for example, a technique of performing image correction by performing filtering by using different filter data in accordance with a position to be processed in an image to meet changes in a point spread function (PSF) caused by the angle of incident light (see, for example, Japanese Laid-open Patent Publication No. 2012-23498).

SUMMARY

According to an aspect of the embodiments, an image processing apparatus includes: a processor coupled to a memory, configured to: perform an analysis of resolution in at least two directions of an image which is taken from a subject having a radial pattern, and determine filter data containing an adjusted weight coefficient which is obtained by adjusting a weight coefficient in one of the two directions, whichever has lower resolution, based on a result of the analysis of the image corrected by filtering on the image in accordance with a blurring function of the image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 36 illustrates an example of an inverse filter table.

DESCRIPTION OF EMBODIMENTS

Hereinafter, embodiments will be described with reference to the attached drawings.

While inventing the present embodiments, observations were made regarding a related art. Such observations include the following, for example.

In the related art, resolution differs depending on the direction. Hereinafter, this property of resolution is referred to as the anisotropy of resolution. For example, resolution in a radial direction with an optical axis at the center thereof is different from resolution in a circumferential direction.

In a technique of the related art, blurring is corrected by performing different filtering in accordance with the position of an image. However, with this method, it is difficult to improve the anisotropy of resolution.

Therefore, the present technique provides an image processing apparatus, an image processing method, and an image processing program which make it possible to determine filter data that improves the anisotropy of resolution while correcting blurring.

Figure 1:
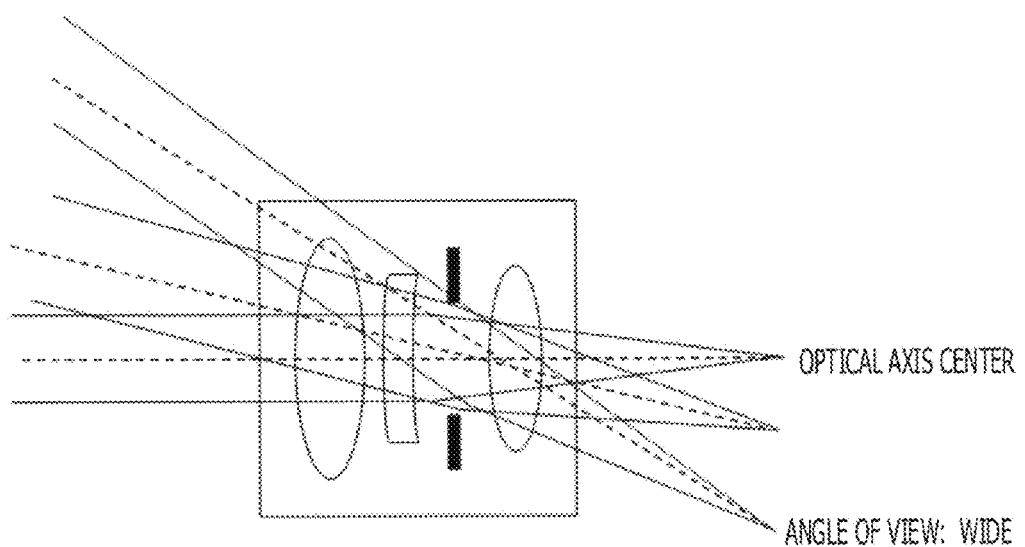
FIG. 1 illustrates an example of an optical system.
Figure 2:
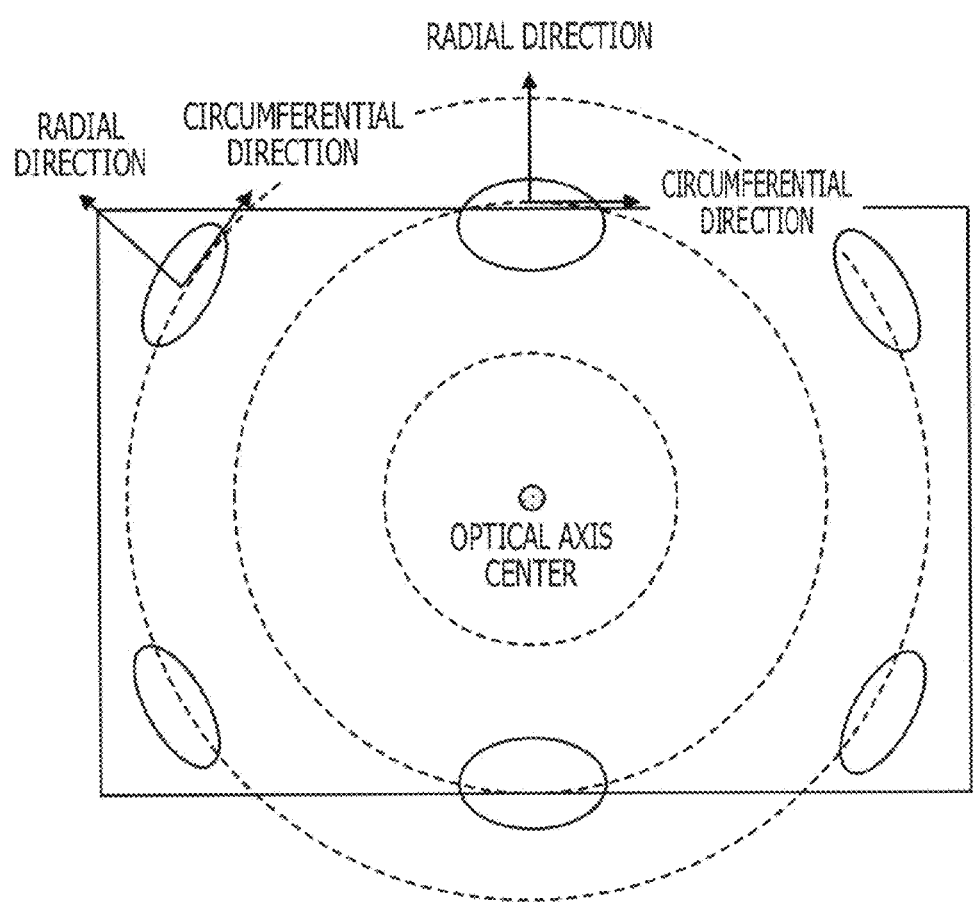
FIG. 2 illustrates an example of an aperture in each image position.

First, one factor that causes a reduction in resolution will be described by using FIGS. 1 to 3. FIG. 1 illustrates an example of an optical system. FIG. 2 illustrates an example of an aperture in each image position. When the optical system illustrated in FIG. 1 is used, as illustrated in FIG. 2, an aperture at the optical axis center is circular, but vignetting occurs in an aperture when an angle of view is large. As illustrated in FIG. 2, an aperture takes the form of an ellipse depending on the image position.

Figure 3:
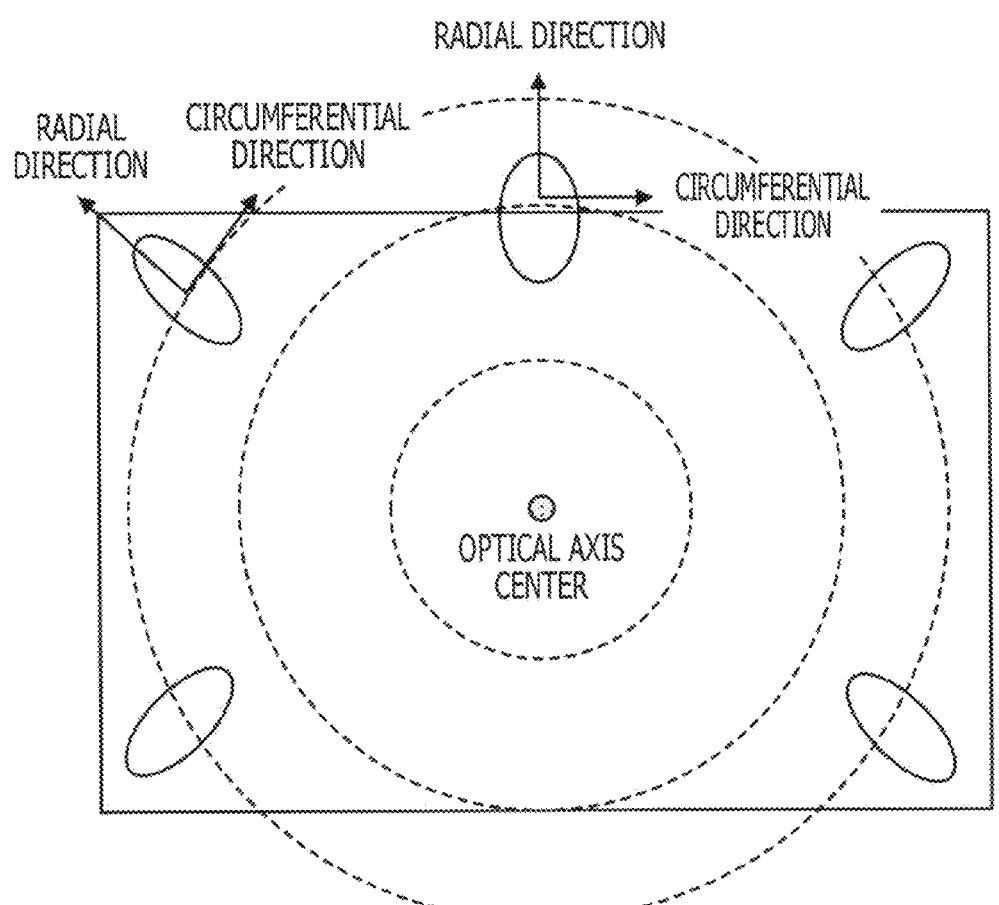
FIG. 3 illustrates the direction of blurring in each image position.

FIG. 3 illustrates the direction of blurring in each image position. When the optical system illustrated in FIG. 1 is used, as illustrated in FIG. 3, since resolution is reduced as an aperture becomes small, blurring tends to become greater in a radial direction.

Next, the analysis of resolution conducted by the inventors will be described. It is possible to analyze the tendency of a reduction in resolution in detail by taking an image of a Siemens star (also referred to below as a chart) in which edges are distributed in a radial fashion.

Figure 4:
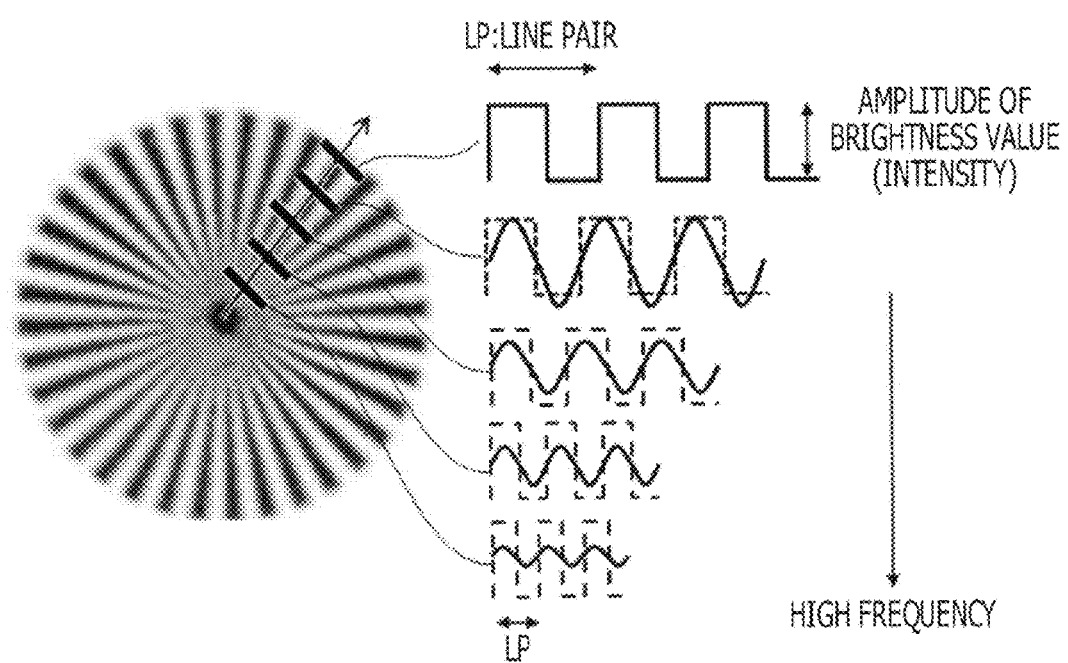
FIG. 4 illustrates resolution when a wedge-shaped chart is used.

FIG. 4 illustrates resolution when a wedge-shaped chart is used. In an example illustrated in FIG. 4, to measure resolution in a direction of an arrow, a plurality of pieces of data are acquired in a direction perpendicular to the direction of an arrow. When a wedge-shaped Siemens star illustrated in FIG. 4 is used, the width of a line becomes narrower and the number of lines per unit pixel is increased toward the center from the end. The center represents a high frequency component. Moreover, the amplitude (intensity) of a brightness value is decreased toward the center from the end.

As illustrated in FIG. 4, by using a subject that spreads in a radial fashion, for example, a wedge-shaped subject, it is possible to analyze resolution (modulation transfer function (MTF)) in accordance with a direction.

Figure 5:
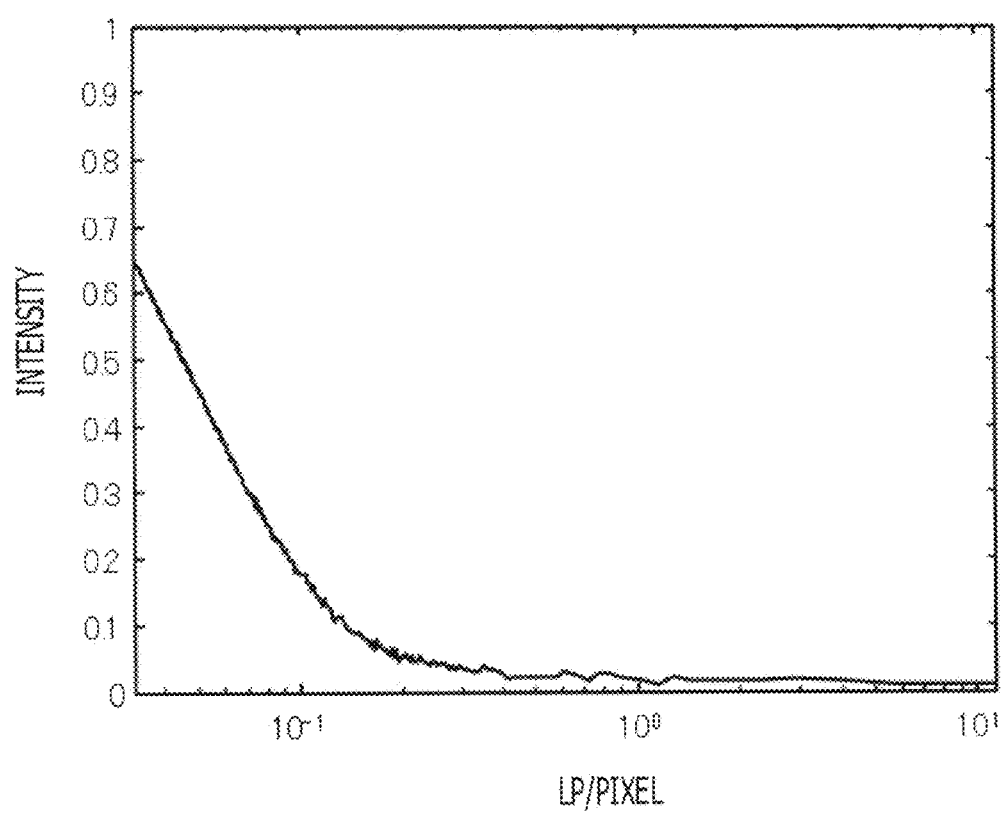
FIG. 5 illustrates the result of measurement of resolution, the result obtained by using the wedge-shaped chart.

FIG. 5 illustrates the result of measurement of resolution, the result obtained by using the wedge-shaped chart. FIG. 5 is a graph obtained by measuring resolution in the direction illustrated in FIG. 4. A vertical axis of FIG. 5 represents the amplitude of a brightness value and a horizontal axis represents a number of lines per pixel (line pair (LP)). This analysis makes it possible to analyze a state in which an amplitude is decreased toward the center and resolution (MTF) is reduced as a frequency component becomes a high frequency component (in a right-hand direction of the horizontal axis).

Figure 6:
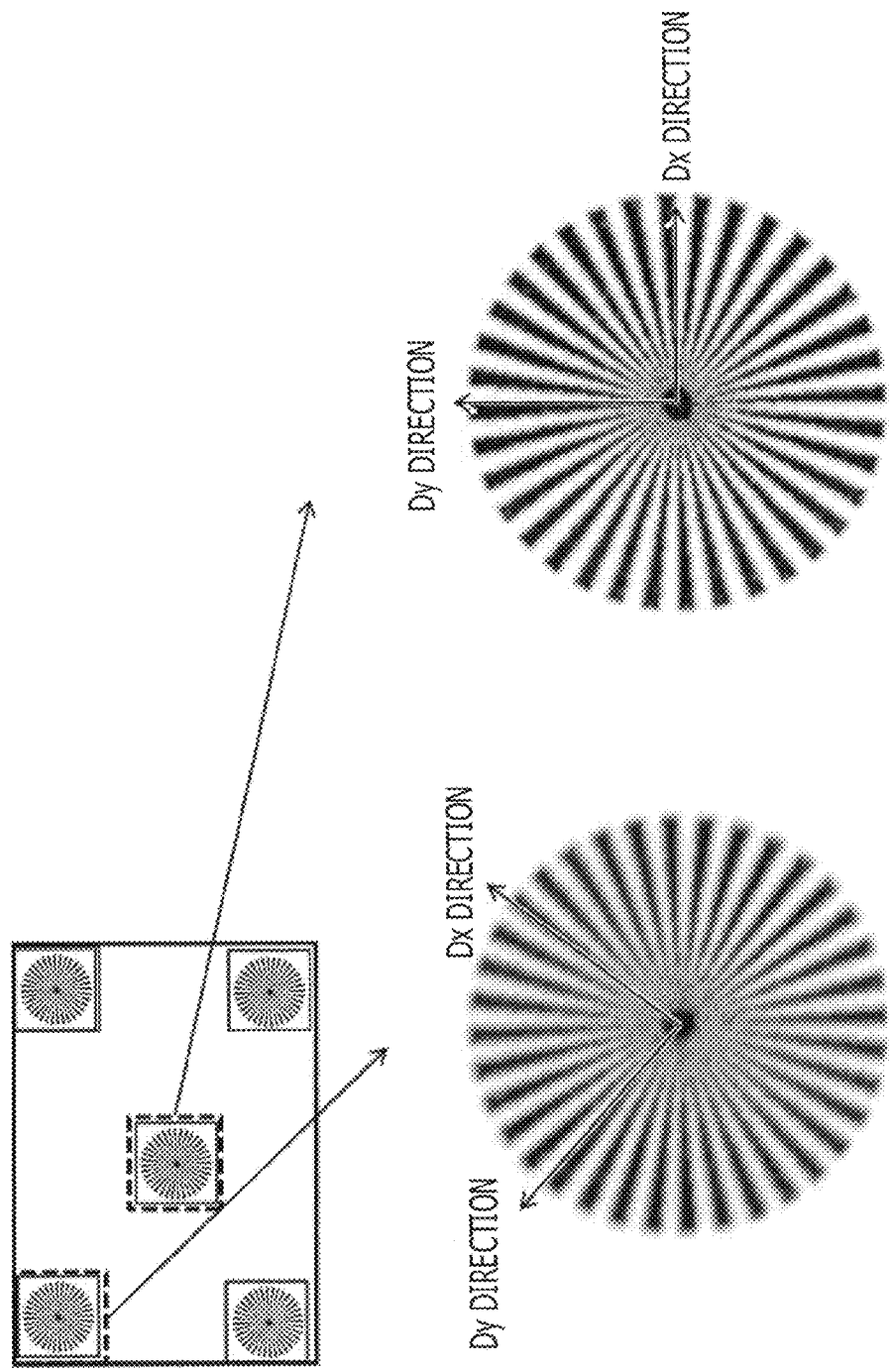
FIG. 6 illustrates a reduction in each taken image position.

FIG. 6 illustrates a reduction in each taken image position. In an example illustrated in FIG. 6, the analysis reveals that, when an image of a plurality of arranged Siemens stars is taken, resolution is reduced at an end as compared to the center. In the example illustrated in FIG. 6, a Dx direction represents a circumferential direction and a Dy direction represents a radial direction. The definition of the Dx direction and the Dy direction is the same in the following drawings.

The analysis illustrated in FIG. 6 indicates the anisotropy in resolution, not just a reduction in resolution, observed in a peripheral part including the image end. A comparison of resolution among the Siemens stars reveals low angle dependence at the center and angle dependence at the end.

Figure 7:
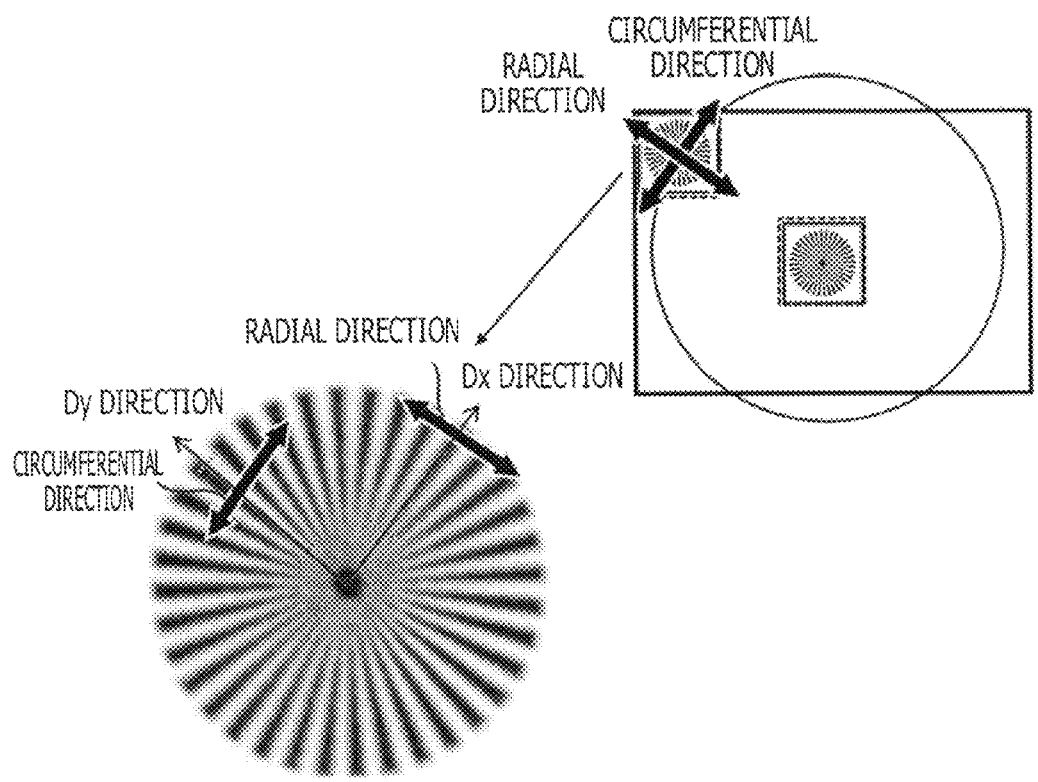
FIG. 7 illustrates an example of a wedge-shaped chart at an end of a taken image.

FIG. 7 illustrates an example of a wedge-shaped chart at an end of a taken image. In the wedge-shaped chart illustrated in FIG. 7, resolution is analyzed in a direction (a radial direction) perpendicular to the Dx direction and in a direction (a circumferential direction) perpendicular to the Dy direction.

Figure 8:
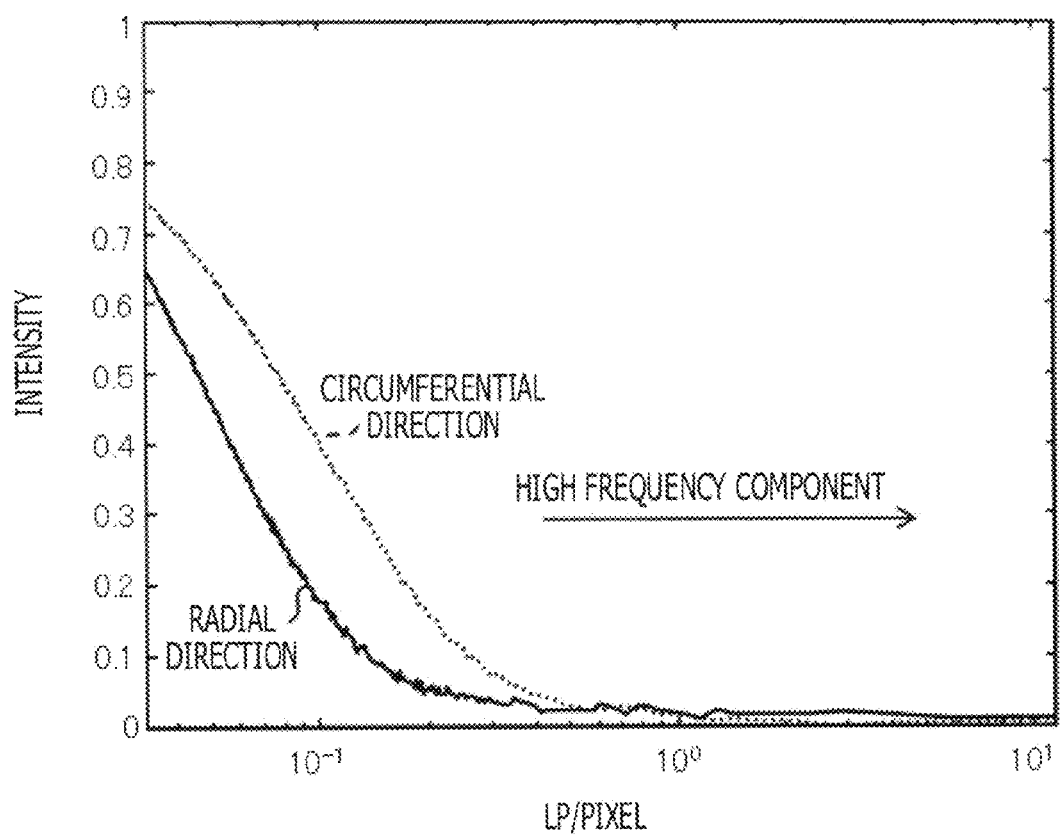
FIG. 8 illustrates the result of the resolution analysis of the wedge-shaped chart illustrated in FIG. 7.

FIG. 8 illustrates the result of the resolution analysis of the wedge-shaped chart illustrated in FIG. 7. As illustrated in FIG. 8, the resolution in the radial direction is reduced as compared to the resolution in the circumferential direction. This indicates that the resolution exhibits anisotropy at the image end, and it is possible to measure the resolution in a quantitative way.

Figure 9:
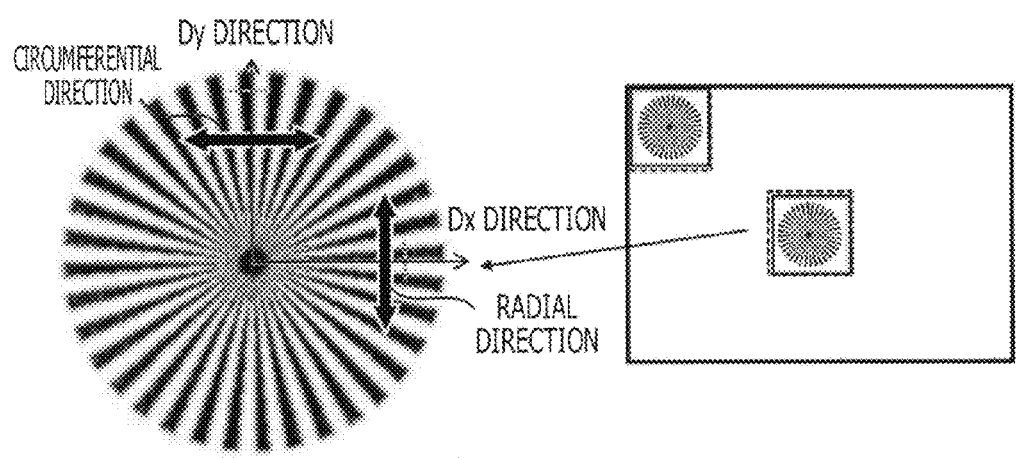
FIG. 9 illustrates an example of a wedge-shaped chart at the center of the taken image.

FIG. 9 illustrates an example of a wedge-shaped chart at the center of the taken image. In the wedge-shaped chart illustrated in FIG. 9, resolution is analyzed in a direction (a radial direction) perpendicular to the Dx direction and in a direction (a circumferential direction) perpendicular to the Dy direction.

Figure 10:
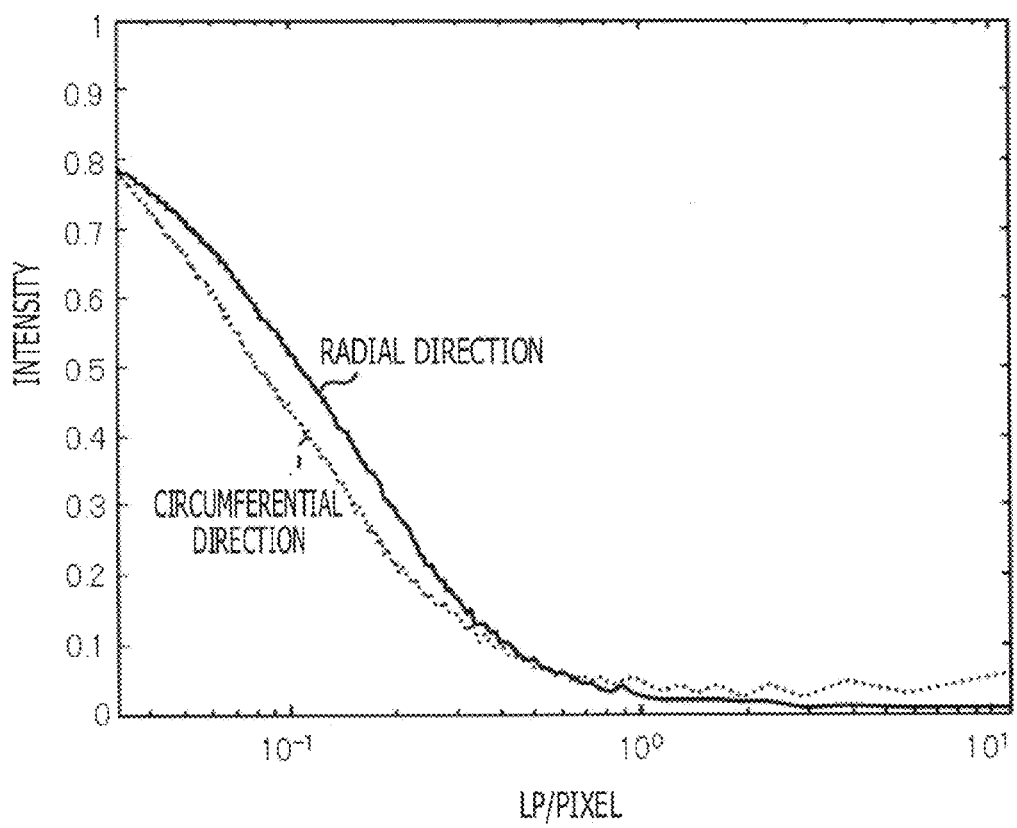
FIG. 10 illustrates the result of the resolution analysis of the wedge-shaped chart illustrated in FIG. 9.

FIG. 10 illustrates the result of the resolution analysis of the wedge-shaped chart illustrated in FIG. 9. As illustrated in FIG. 10, there is not much difference between the resolution in the radial direction and the resolution in the circumferential direction. This indicates that the resolution does not exhibit anisotropy at the center of the image.

Here, to correct blurring including a reduction in resolution described above, there is a technique of correction by using a point spread function (PSF). The PSF is a function indicating blurring, for example. Hereinafter, the function indicating blurring is also referred to as a blurring function.

Let an original image be x and the PSF be k. Then, a blurring image y is an image yielded by the convolution of x and k and is given by the following expression.

$$y = k \otimes x \qquad (1)$$

$\otimes$ : Convolution

Although noise n is actually contained, the noise n is omitted here for ease of explanation.

When a Fourier transform is performed on Expression (1), Expression (2) is obtained.

$$Y(\omega) = K(\omega) X(\omega) \qquad (2)$$

$\omega$: Spatial frequency

Next, an inverse filter $K_{inv}$ is simply obtained as the reciprocal of K.

$$K_{inv}(\omega) = 1/K(\omega) \qquad (3)$$

As a result, a Fourier transform $X(\omega)$ of the original image is given by Expression (4). By performing an inverse Fourier transform on Expression (4), the original image is calculated.

$$X(\omega) = K_{inv}(\omega) Y(\omega) \qquad (4)$$

When a Fourier transform is performed on the PSF and an inverse filter function (also simply referred to below as an inverse filter) obtained as a reciprocal is calculated in the manner described above, since division by a spatial frequency is performed, division by 0 may be performed in a high frequency region. Division by 0 is division by 0 or a value close to 0. When a high frequency is close to 0, the reciprocal thereof becomes too large, which enhances noise at the high frequency.

Figure 11:
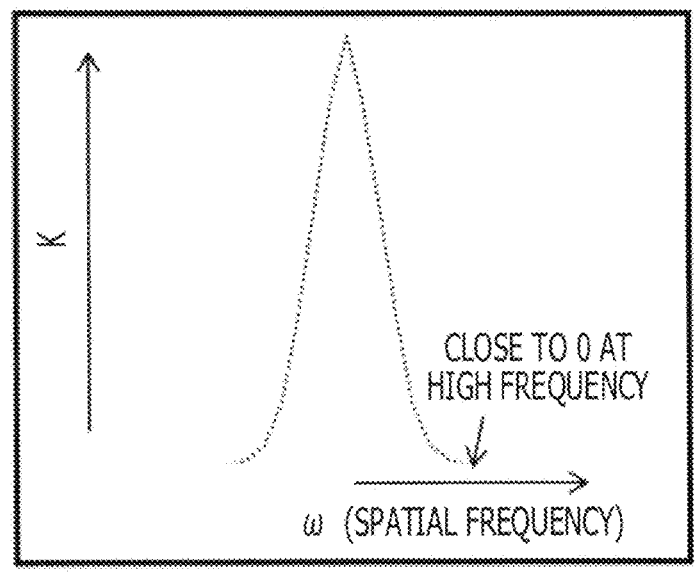
FIG. 11 illustrates a characteristic example when a Fourier transform is performed on a blurring function.

FIG. 11 illustrates a characteristic example when a Fourier transform is performed on a blurring function. FIG. 11 indicates K(ω), which is close to 0 at a high frequency.

Figure 12:
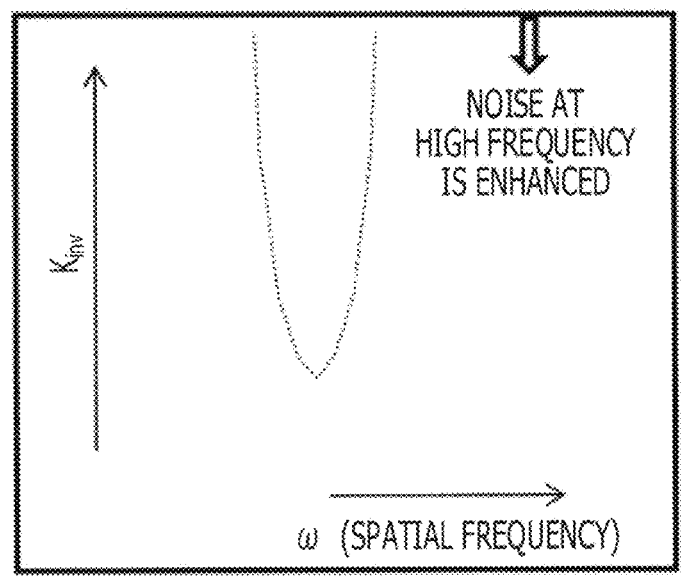
FIG. 12 illustrates the reciprocal of $K(\omega)$.

FIG. 12 illustrates the reciprocal of K(ω). FIG. 12 indicates $K_{inv}$ obtained by Expression (3). Since a denominator is close to 0 at a high frequency, for example, noise at the high frequency is enhanced.

Thus, to reduce noise at the high frequency, a correction term is inserted into a denominator so that noise at the high frequency is not enhanced.

$$K_{inv}(\omega)=1/(K(\omega)+\lambda) \quad (5)$$

$$K_{inv}(\omega)=K(\omega)/(K(\omega)\overline{K(\omega)}+\lambda\overline{\lambda}) \quad (6)$$

$\overline{K(\omega)}$: Complex conjugate number

Since the inverse filter is a conjugate number, the inverse filter is expressed by using a complex conjugate number.

Figure 13:
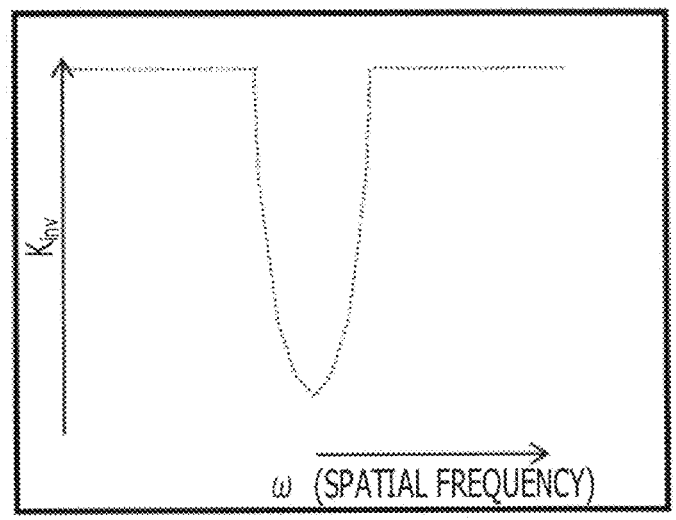
FIG. 13 illustrates an inverse filter when a certain value is added to a denominator.
Figure 14:
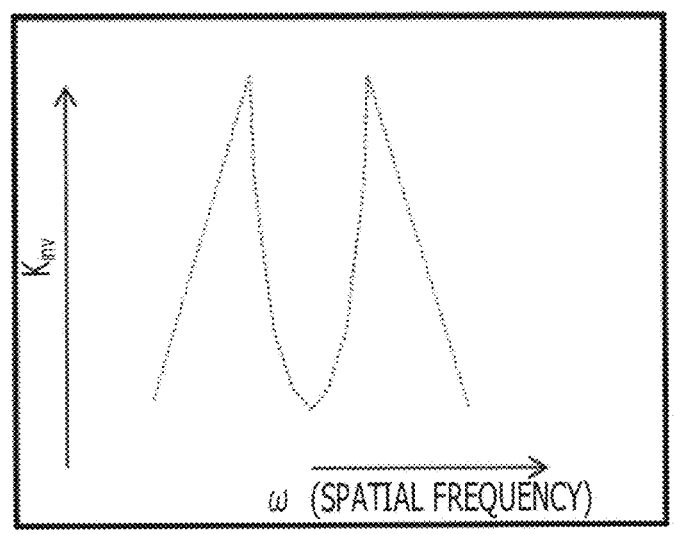
FIG. 14 illustrates an inverse filter when a gain is lowered as the frequency becomes high.

FIG. 13 illustrates an inverse filter when a certain value is added to a denominator. FIG. 14 illustrates an inverse filter when a gain is lowered as the frequency becomes high. As illustrated in FIGS. 13 and 14, noise is reduced by assigning weight to each frequency component.

Figure 15:
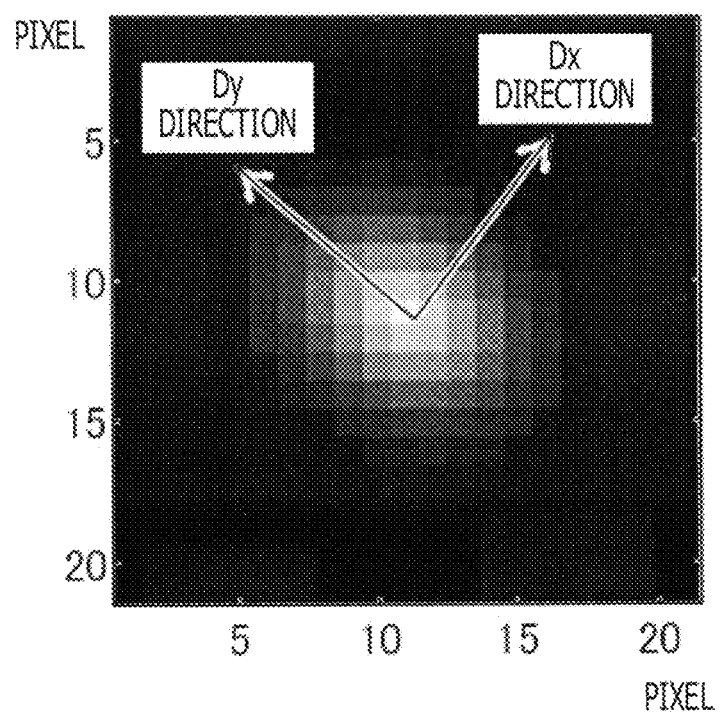
FIG. 15 illustrates an example of a PSF of an ellipse.

Here, a PSF of an ellipse will be discussed. FIG. 15 illustrates an example of a PSF of an ellipse. The example illustrated in FIG. 15 indicates that the resolution in the Dy direction is lower than the resolution in the Dx direction. That is, the resolution in the Dy direction is reduced as compared to the resolution in the Dx direction.

A PSF of an ellipse is expressed as k(r, θ). Here, r represents a radius and θ represents a direction. For example, a PSF of an ellipse is expressed as a function of the radius r and the direction θ. When a Fourier transform is performed on the PSF of the ellipse, K(ω, θ)=fk(r, θ) holds. Here, f represents a Fourier transform. For example, K(ω, θ) after a Fourier transform is a function of the spatial frequency ω and the direction θ.

Figure 16:
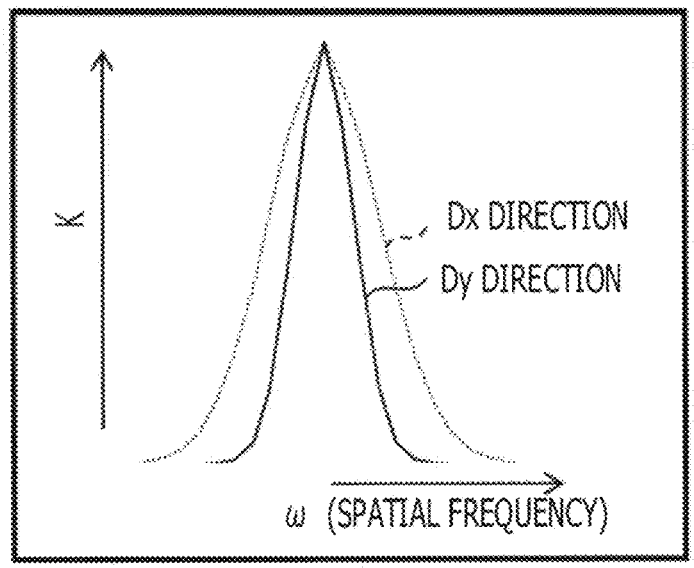
FIG. 16 illustrates a characteristic example when a Fourier transform is performed on a blurring function of an ellipse.

FIG. 16 illustrates a characteristic example when a Fourier transform is performed on a blurring function of an ellipse. FIG. 16 uses the blurring function of FIG. 15, and characteristics differ depending on the direction θ. As illustrated in FIG. 16, the characteristics in the Dx direction are different from the characteristics in the Dy direction with lower resolution.

Figure 17:
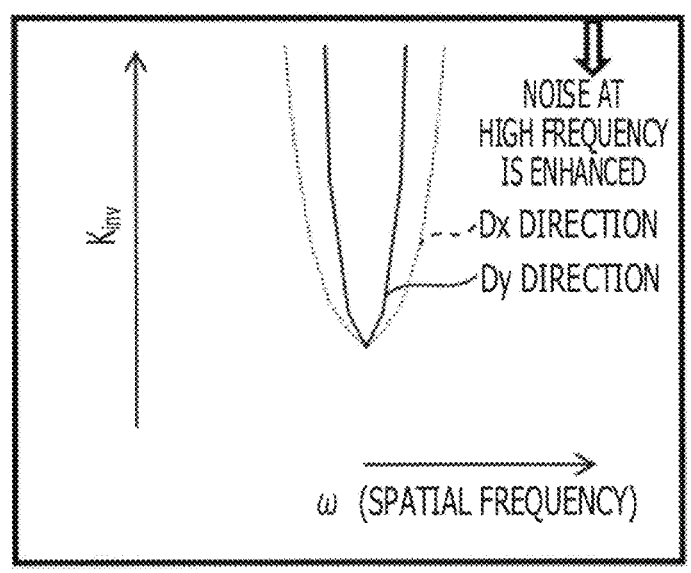
FIG. 17 illustrates the reciprocal of $K(\omega, \theta)$.

FIG. 17 illustrates the reciprocal of K(ω, θ). FIG. 17 illustrates $K_{inv}$ obtained by Expression (7). For example, a denominator is close to 0 at a high frequency, which causes an increase in noise at the high frequency.

$$K_{inv}(\omega,\theta)=1/K(\omega,\theta) \quad (7)$$

Thus, to reduce noise at the high frequency, a correction term is inserted into a denominator so that noise at the high frequency is not enhanced. Expression (8) represents an inverse filter that reduces noise at a high frequency.

$$K_{inv}(\omega,\theta)=K(\omega,\theta)/(K(\omega,\theta)\overline{K(\omega,\theta)}+\lambda\overline{\lambda}) \quad (8)$$

Figure 18:
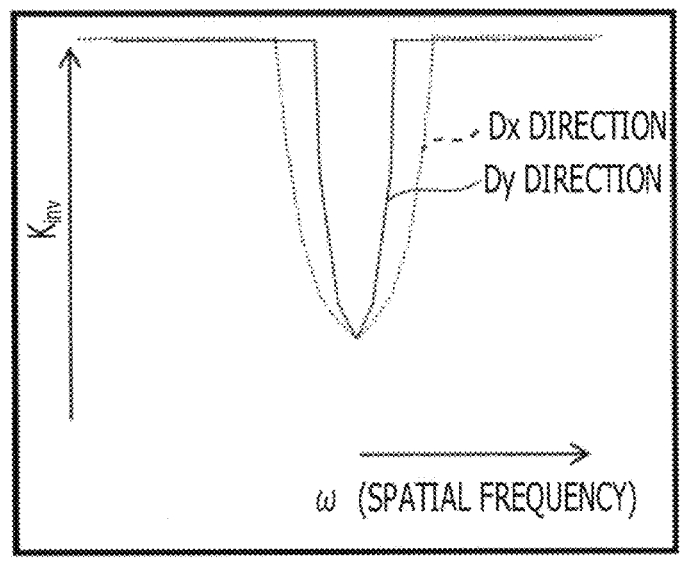
FIG. 18 illustrates an inverse filter when a certain value is added to a denominator.
Figure 19:
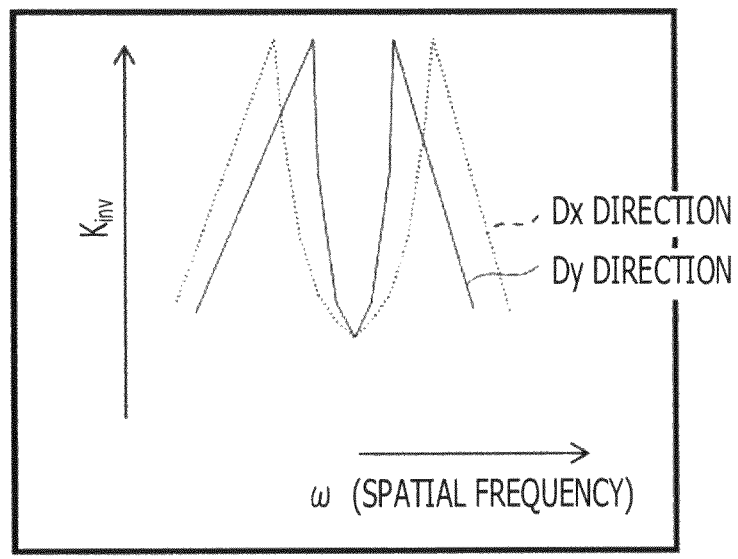
FIG. 19 illustrates an inverse filter when a gain is lowered as the frequency becomes high.

FIG. 18 illustrates an inverse filter when a certain value is added to a denominator. FIG. 19 illustrates an inverse filter when a gain is lowered as the frequency becomes high. As illustrated in FIGS. 18 and 19, noise is reduced by assigning weight to each frequency component.

Even in the case of a blurring function (for example, a PSF) of an ellipse, it is possible to reduce noise at a high frequency by corrected weight (λ). However, with this correction by weight, it is impossible to correct and improve a direction with lower resolution (for example, the Dy direction). Therefore, the mere addition of weight does not make it possible to improve the anisotropy of resolution. Based on this, the inventors have found out that it is possible to improve the anisotropy of resolution by adjusting an appropriate weighting function in accordance with a direction.

Figure 20:
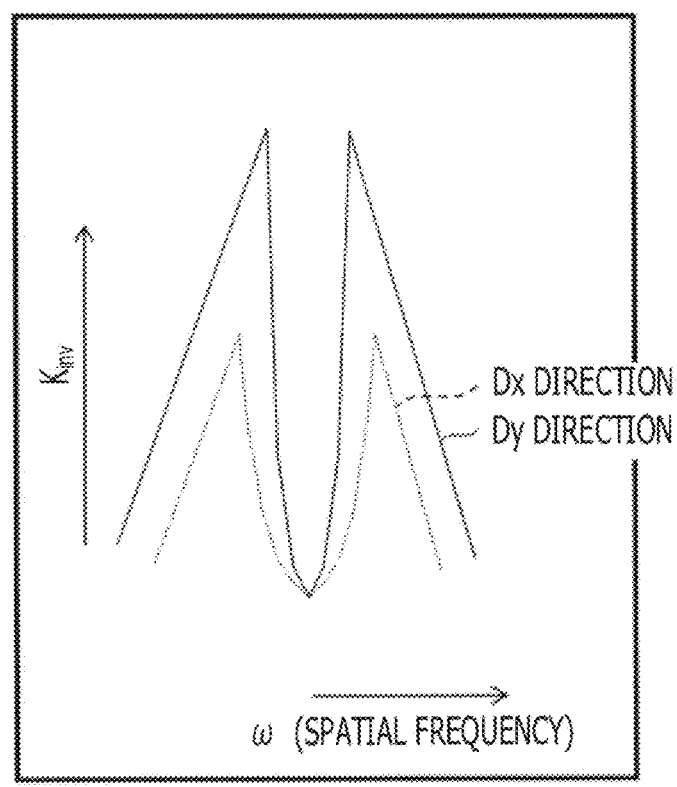
FIG. 20 illustrates an example of an inverse filter to improve the anisotropy of resolution.

FIG. 20 illustrates an example of an inverse filter to improve the anisotropy of resolution. The example illustrated in FIG. 20 is an example in which, while a gain is lowered as the frequency becomes high, an improvement is further enhanced in the Dy direction with lower resolution.

Hereinafter, embodiments for improving the anisotropy of resolution will be described. In the embodiments which will be described below, as illustrated in FIG. 20, a description will be given by using a method of lowering a gain. However, a method is not limited to the above method. For example, it is also possible to improve the anisotropy of resolution even by a method of adding a certain value as in FIG. 13. In this case, a certain value simply has to be added in such a way that greater enhancement is achieved in the Dy direction as compared to the Dx direction.

Embodiment 1

First, an embodiment that generates filter data for improving the anisotropy of resolution will be described.

Configuration

Figure 21:
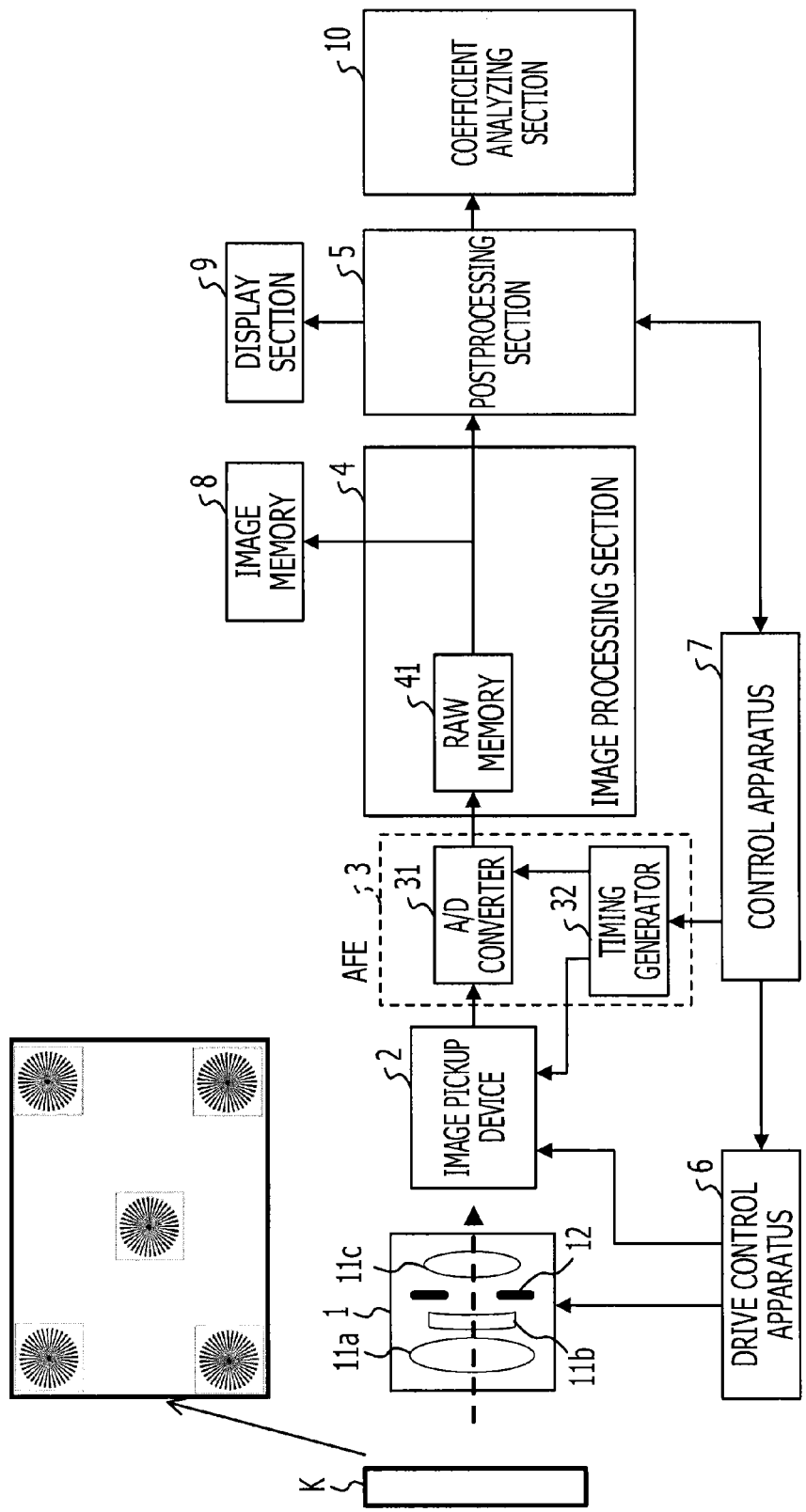
FIG. 21 is a block diagram of an example of a general configuration of an imaging device including an image processing apparatus in Embodiment 1.

FIG. 21 is a block diagram of an example of a general configuration of an imaging device including an image processing apparatus in Embodiment 1. The imaging device illustrated in FIG. 21 includes an optical system 1, an image pickup device 2, an analog front end (AFE) 3, an image processing section 4, a postprocessing section 5, a drive control apparatus 6, a control apparatus 7, an image memory 8, a display section 9, and a coefficient analyzing section 10.

The optical system 1 concentrates light from a subject K having a radial pattern on an image surface. For example, the optical system 1 includes lenses 11a, 11b, and 11c and a diaphragm 12. The lenses 11a, 11b, and 11c and the diaphragm 12 concentrate light from the subject K on an imaging area of the image pickup device 2 and form an image of the subject K. The drive control apparatus 6 is capable of controlling the positions of the lenses 11a, 11b, and 11c, the aperture degree of the diaphragm 12, and the like. Incidentally, the configuration of the optical system 1 is not limited to a particular configuration.

The image pickup device 2 converts the light from the subject K, the light concentrated by the optical system 1, into an electronic signal (an analog signal). The image pickup device 2 includes a two-dimensional image pickup device such as a CCD or a CMOS. The two-dimensional image pickup device converts the image of the subject K into an electronic signal (an image signal) and outputs the electronic signal to the AFE 3.

The AFE 3 converts the analog signal of the taken image into a digital signal. The AFE 3 includes, for example, an analog-to-digital (A/D) converter 31 and a timing generator 32. The timing generator 32 generates, based on a control signal from the control apparatus 7, a timing pulse used for driving the image pickup device 2 and outputs the timing pulse to the image pickup device 2 and the A/D converter 31.

The image processing section 4 stores the image of the digital signal and performs predetermined image processing.

The image processing section 4 includes, for example, a RAW memory 41 that records an image (a RAW image) converted into a digital signal by the A/D converter 31. The image processing section 4 may perform predetermined processing on the RAW image. The image on which the predetermined processing has been performed is recorded on the image memory 8.

The postprocessing section 5 generates a display image by further performing desired processing on the image on which the predetermined processing has been performed. The postprocessing section 5 reads, for example, the image on which the predetermined processing has been performed from the image memory 8 and performs desired processing to generate an image for display, and outputs the image to the display section 9.

The image memory 8 stores the image subjected to predetermined processing. The display section 9 includes, for example, a VRAM that records an image and a display that outputs the image in the VRAM. Incidentally, the imaging device does not necessarily have to have a display function, and, in place of the display section 9, a recording section (for example, a VRAM) that records an image for display may be provided.

The drive control apparatus 6 controls the optical system 1. The control apparatus 7 controls the AFE 3 and the postprocessing section 5.

The coefficient analyzing section 10 analyzes resolution in each direction in each image position based on an image obtained by taking an image of a chart, and determines appropriate filter data for improving the anisotropy of resolution. The details of the coefficient analyzing section 10 will be described later.

The filter data may be, for example, a set of parameters used for filtering for image correction, such as a deconvolution kernel. Specifically, the deconvolution kernel is expressed as a region in which an image of a circular or elliptic subject in accordance with a PSF is distributed and data representing the weight of each pixel in the region (such data is referred to as a deconvolution distribution).

Inverse Filter

Here, the inverse filter used in the embodiment will be described. Hereinafter, the procedure for calculating an inverse filter that improves the anisotropy of resolution, for example, an inverse filter that adjusts a direction with lower resolution will be described. Moreover, the inverse filter is also simply referred to as a filter.

As in Expression (1), it is assumed that an original image is x, a PSF is k, and a blurring image is y. If Expression (9) is minimized as an inverse problem when the original image x is obtained, it is possible to obtain an image close to the original image.

$$\|y - k \otimes x\|^2 \quad (9)$$

In general, a regularization term of some kind is provided when an inverse problem is solved. Thus, a regularization term is added, and the inverse problem is solved by Expression (10).

$$\|y - k \otimes x\|^2 + \epsilon E(x) \quad (10)$$

Since this problem uses directionality, a derivative term of a lateral (horizontal) direction (x direction) of the image and a derivative term of a longitudinal (vertical) direction (y direction) of the image are added as regularization terms.

$$\|y - k \otimes x\|^2 + \epsilon\{\|d_m \otimes x\|^2 + \|d_n \otimes x\|^2\} \quad (11)$$

$\epsilon$: Weight coefficient, $d_m$ and $d_n$: Differential filters in a matrix direction $$d_m = \begin{bmatrix} -1 & 1 \end{bmatrix}$$

$$d_n = \begin{bmatrix} -1 \\ 1 \end{bmatrix}$$

To minimize Expression (11), the result obtained by performing partial differentiation on Expression (11) with respect to x only has to be 0, and, by performing a Fourier transform and solving for $X(\omega)$, Expression (12) below is obtained.

$$X(\omega) = \frac{K(\omega)Y(\omega)}{K(\omega)^2 + \epsilon\{D_m(\omega)^2 + D_n(\omega)^2\}} \quad (12)$$

where $X(\omega), Y(\omega), K(\omega), D_m(\omega)$, and $D_n(\omega)$ represent Fourier transforms of x, y, k, $d_m$, and $d_n$, respectively.

The inverse filter $K_{inv}(\omega)$ in a frequency region satisfies Expression (13).

$$X(\omega) = K_{inv}(\omega)Y(\omega) \quad (13)$$

Therefore, the inverse filter $K_{inv}(\omega)$ satisfies Expression (14) below.

$$K_{inv}(\omega) = \frac{K(\omega)}{K(\omega)^2 + \epsilon\{D_m(\omega)^2 + D_n(\omega)^2\}} \quad (14)$$

When a complex conjugate number is used, Expression (14) becomes Expression (15).

$$K_{inv}(\omega) = \frac{\overline{K(\omega)}}{K(\omega)\overline{K(\omega)} + \epsilon\{D_m(\omega)\overline{D_m(\omega)} + D_n(\omega)\overline{D_n(\omega)}\}} \quad (15)$$

$\overline{K(\omega)}$: Complex conjugate number

The feature of the embodiment is that, to adjust a direction with lower resolution, the axis of a differential coefficient is rotated in the direction of an angle θ by using a rotation matrix.

$$D_X(\omega, \theta) = D_m(\omega)\cos\theta - D_n(\omega)\sin\theta \quad (16)$$

$$D_Y(\omega, \theta) = D_m(\omega)\sin\theta + D_n(\omega)\cos\theta \quad (17)$$

By using a rotation matrix, it is possible to provide directionality.

Figure 22:
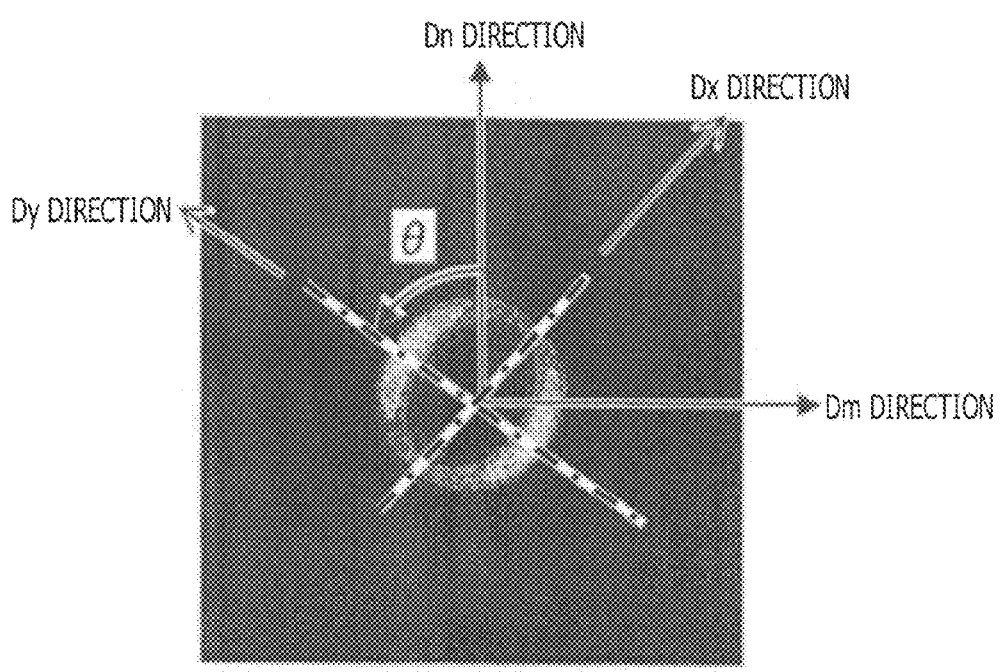
FIG. 22 illustrates rotation.

FIG. 22 illustrates rotation. In an example illustrated in FIG. 22, a Dn direction is rotated θ to obtain the Dy direction, and a Dm direction is rotated θ to obtain the Dx direction.

Here, let a PSF of an ellipse be k(r, θ) and a PSF of an ellipse subjected to a Fourier transform be K(ω, θ)=fk(r, θ). Then, when Expressions (16) and (17) and K(ω, θ) are substituted into Expression (15) and weight γ in accordance with a direction is set, Expression (18) holds.

$$K_{inv}(\omega, \theta) = \frac{\overline{K(\omega, \theta)}}{K(\omega, \theta)\overline{K(\omega, \theta)} + \epsilon\{D_X(\omega, \theta)\overline{D_X(\omega, \theta)} + \gamma D_Y(\omega, \theta)\overline{D_Y(\omega, \theta)}\}} \quad (18)$$

γ: Weight coefficient in accordance with the direction of an inverse filter, ε: Weight coefficient of the whole Expression (18) above makes it possible to make a weight adjustment to the directionality of an inverse filter used in each embodiment. For example, the coefficient analyzing section 10 adjusts the weight γ of the direction (the Dy direction) with lower resolution. By making the weight coefficient γ lower, it is possible to improve the direction with lower resolution.

Figure 23:
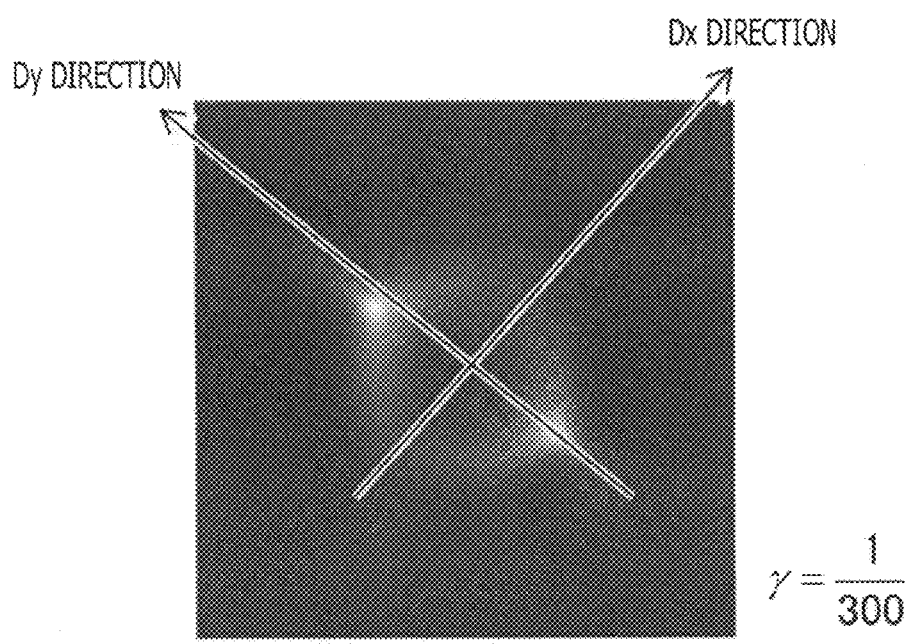
FIG. 23 illustrates an example of a spatial frequency two-dimensional distribution of an inverse filter $K_{inv}$.

FIG. 23 illustrates an example of a spatial frequency two-dimensional distribution of an inverse filter $K_{inv}$. The example of FIG. 23 illustrates a two-dimensional distribution when γ=1/300. The weight coefficients γ and ε (in particular, γ) are determined such that the degree of improvement of the resolution in the Dy direction becomes higher than the degree of improvement of the resolution in the Dx direction.

Figure 24:
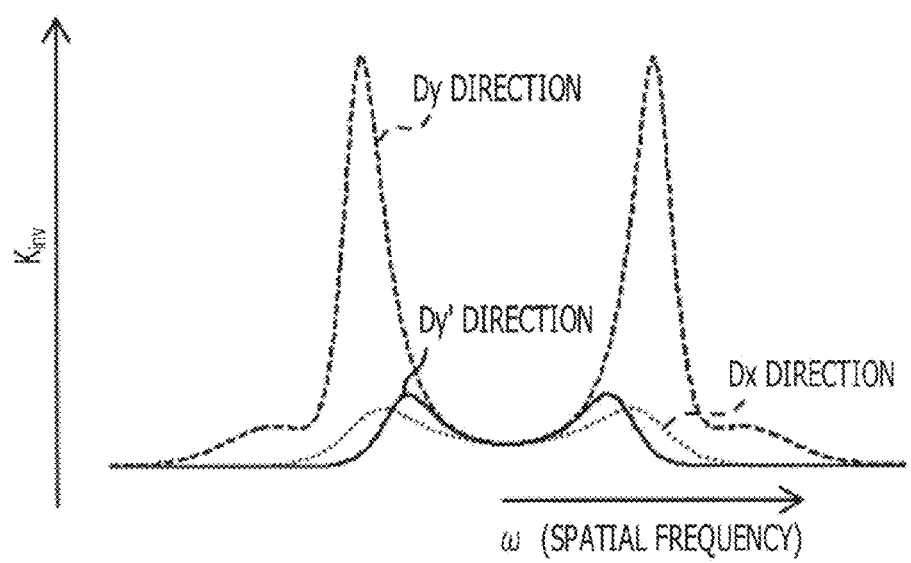
FIG. 24 illustrates an example of a distribution in accordance with a spatial frequency direction of the inverse filter $K_{inv}$.

FIG. 24 illustrates an example of a distribution in accordance with a spatial frequency direction of the inverse filter $K_{inv}$. FIG. 24 indicates that, by making the weight coefficient of the Dy direction lower, it is possible to enhance the improvement in the Dy direction. Moreover, Dy' illustrated in FIG. 24 represents a distribution when γ=1. Thus, according to the embodiment, it is possible to provide anisotropy also to the weight coefficient by which the filter parameters of the inverse filter are multiplied.

Coefficient Analyzing Section

Next, the coefficient analyzing section 10 will be described. The coefficient analyzing section 10 determines filter data for improving the anisotropy of resolution.

Figure 25:
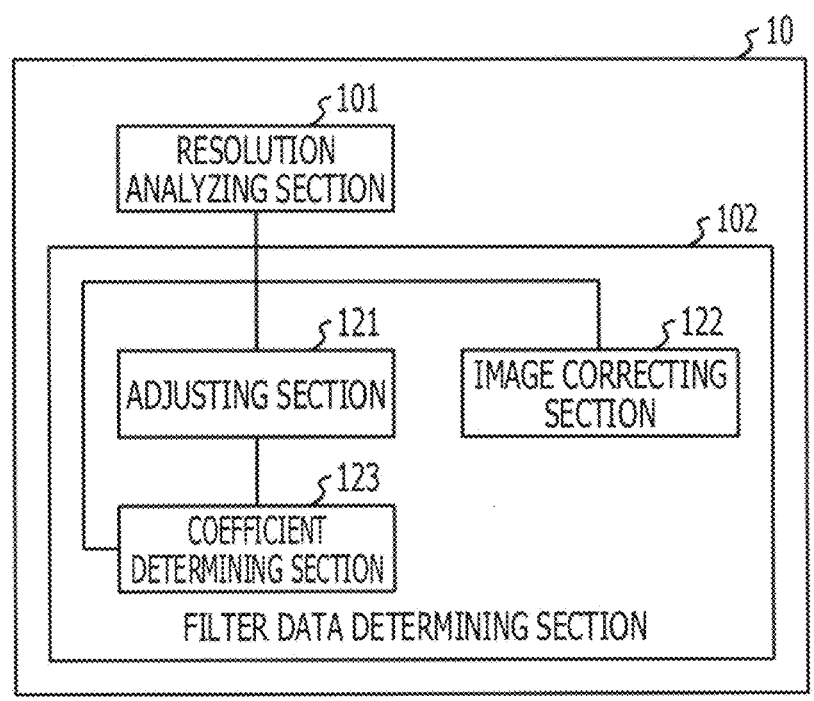
FIG. 25 is a block diagram of an example of the function of a coefficient analyzing section.

FIG. 25 is a block diagram of an example of the function of the coefficient analyzing section 10. The coefficient analyzing section 10 illustrated in FIG. 25 has a resolution analyzing section 101 and a filter data determining section 102. The coefficient analyzing section 10 conducts a coefficient analysis based on an image obtained by taking a chart image. In an example which will be described below, the coefficient analyzing section 10 conducts a coefficient analysis based on a taken wedge-shaped image located in an upper left position, for example.

The resolution analyzing section 101 analyzes, in at least two directions, a reduction in the resolution of an image obtained by taking an image of a subject having a radial pattern. The analysis is performed by using the method described in FIGS. 4 and 5, for example. The resolution analyzing section 101 finds MTF with the number of lines per pixel on the horizontal axis and the amplitude intensity on the vertical axis. As the number of lines per pixel, the number of lines per unit length in an actual subject distance position may be used. In the embodiment, since a wedge-shaped radial chart is used, it is possible to analyze MTF in accordance with a direction as illustrated in FIG. 5.

Figure 26:
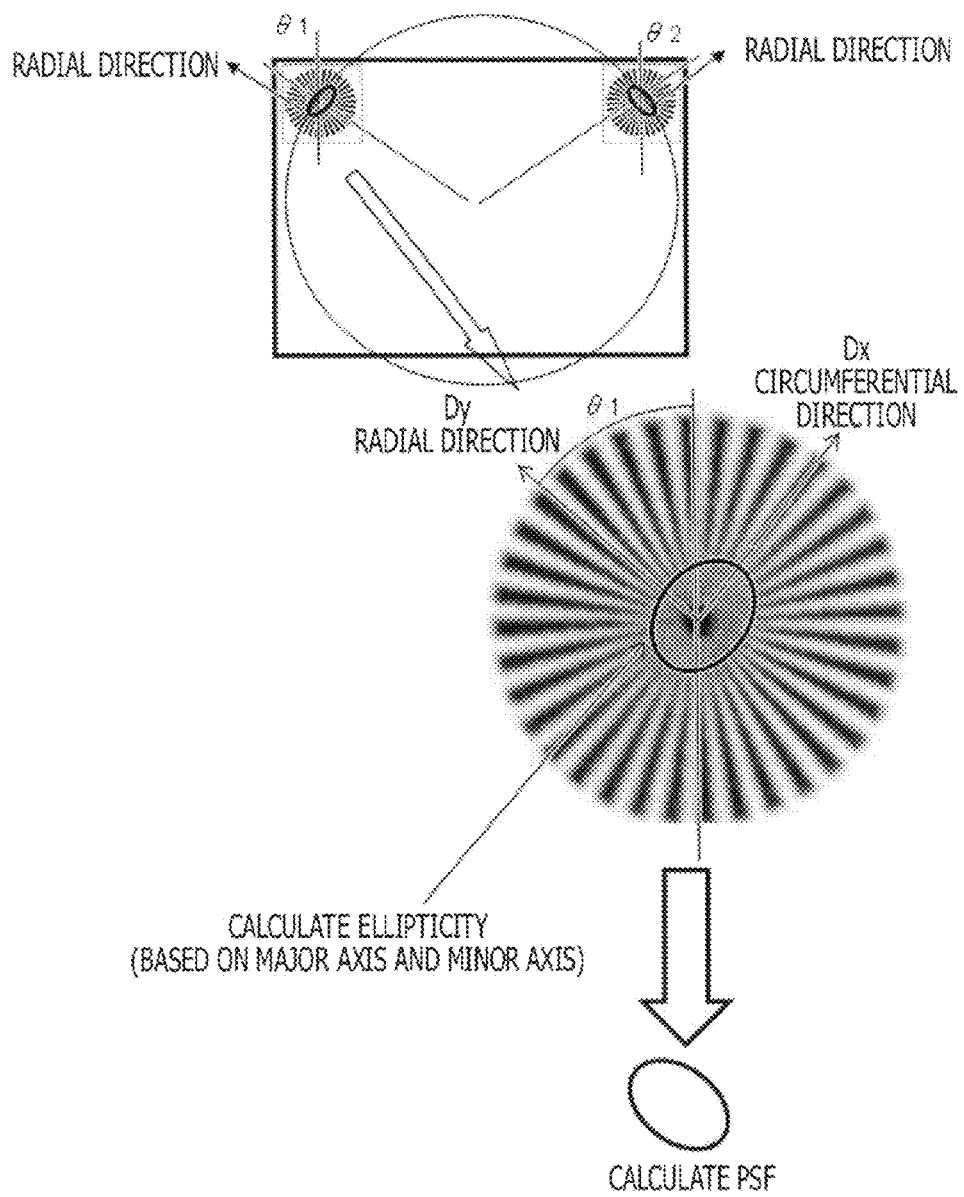
FIG. 26 illustrates the procedure for calculating a PSF.

FIG. 26 illustrates the procedure for calculating a PSF. In an example illustrated in FIG. 26, the filter data determining section 102 first calculates an angle and ellipticity in accordance with the position of an image. The filter data determining section 102 is capable of obtaining an ellipse by generating contour lines with a certain threshold value (about half of the maximum amplitude) in the MTF calculated at intervals of a predetermined angle.

The filter data determining section 102 is capable of calculating ellipticity based on the major axis and the minor axis of the obtained ellipse. The filter data determining section 102 geometrically calculates an angle θ1 based on the position of the image. Moreover, the filter data determining section 102 is also capable of calculating the angle θ1 based on the major axis and the minor axis of an ellipse of resolution. Calculating the angle θ1 based on the major axis and the minor axis is preferable because this makes it possible to calculate an angle in accordance with the actual degree of blurring. Here, as described by using FIG. 3, greater blurring occurs in a radial direction when concentric circles are described from the optical axis center.

The filter data determining section 102 only has to calculate an angle which a longitudinal direction forms with a radial direction, for example. Incidentally, the optical axis center basically coincides with the center of the image, but the optical axis center may be off the center of the image due to displacements of lenses. The filter data determining section 102 determines a PSF based on the calculated ellipticity and angle. An ellipse with the PSF thus determined is an ellipse rotated 90 degrees from the ellipse obtained based on the contour lines of the MTF.

Back in FIG. 25, the filter data determining section 102 determines, for the image corrected by the filter (the above-described inverse filter) in accordance with the blurring function (PSF) of the image, filter data having the anisotropy of the inverse filter based on the result of the resolution analysis of the corrected image.

Moreover, the filter data determining section 102 determines a different weight coefficient (for example, γ) for each of the differential directions of the image. For example, the filter data determining section 102 determines 1 as the weight coefficient of the Dx direction and γ as the weight coefficient of the Dy direction, and adjusts γ. This makes it possible to improve the anisotropy of resolution.

Furthermore, the filter data determining section 102 determines the weight coefficients by rotation (for example, θ) in the differential directions. This makes it possible to detect a direction with lower resolution and perform filtering.

Specifically, the filter data determining section 102 determines appropriate weight coefficients ε and γ by adjusting the weight coefficients ε and γ, for example. The weight coefficient γ represents the weight coefficient of a filter parameter of a direction with lower resolution. The filter parameters of a direction with lower resolution are, for example, Dy(ω, θ) and a complex conjugate number of Dy(ω, θ) which are multiplied by the weight coefficient γ in Expression (18).

To determine the weight coefficient after performing an adjustment, the filter data determining section 102 includes an adjusting section 121, an image correcting section 122, and a coefficient determining section 123.

The adjusting section 121 adjusts, for example, the weight coefficient ε which does not depend on the direction and the weight coefficient γ which depends on the direction. The adjusting section 121 sets initial values of the weight coefficients ε and γ and passes the initial values to the image correcting section 122.

The image correcting section 122 performs image correction by using the weight coefficients obtained from the adjusting section 121. The image correcting section 122 corrects the image by performing filtering thereon by using the inverse filter in Expression (18). The image correcting section 122 passes the corrected image to the resolution analyzing section 101 to make the resolution analyzing section 101 analyze a reduction in resolution again.

The coefficient determining section 123 determines the weight coefficients based on the result of the resolution analysis of the corrected image in such a way that a difference in a reduction in resolution between two directions becomes small. The coefficient determining section 123 retains the result of the analysis of the image corrected by various weight coefficients, and determines the weight coefficients ε and γ in such a way that a difference between spatial frequency values is minimized at predetermined amplitude intensity, for example (determination processing 1).

Figure 27:
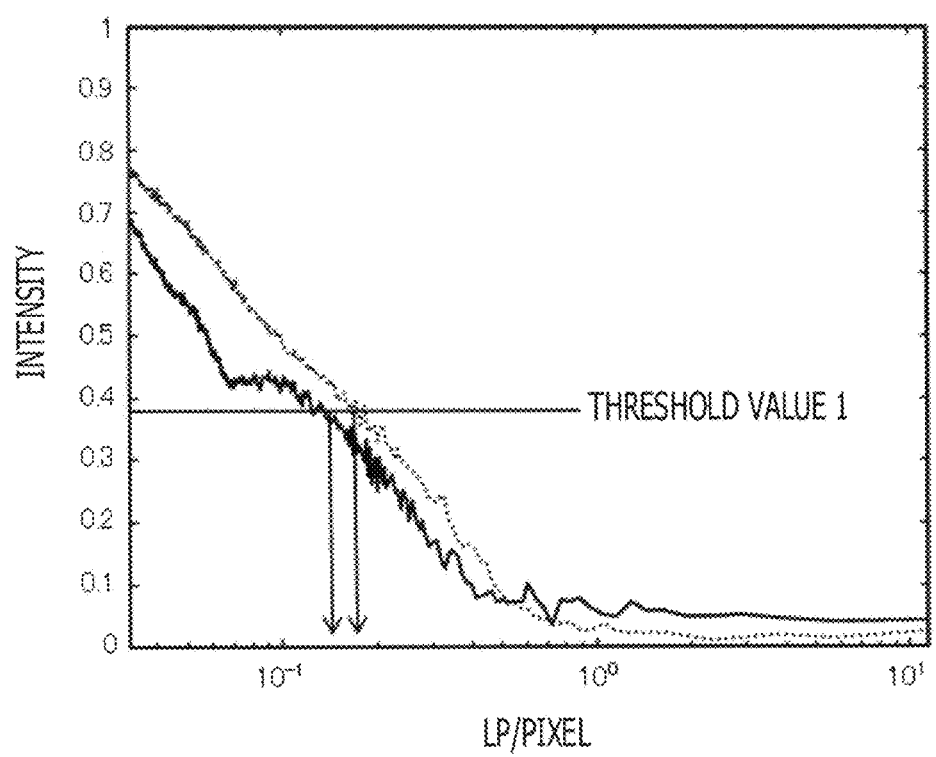
FIG. 27 illustrates an example of weight coefficient determination processing 1.

FIG. 27 illustrates an example of weight coefficient determination processing 1. As illustrated in FIG. 27, the coefficient determining section 123 determines the weight coefficients in such a way that a difference in spatial frequency becomes small at predetermined amplitude intensity (threshold value 1).

Moreover, the coefficient determining section 123 may determine the weight coefficients $\epsilon$ and $\gamma$ in such a way that a difference in amplitude intensity is minimized at a predetermined spatial frequency (determination processing 2).

Figure 28:
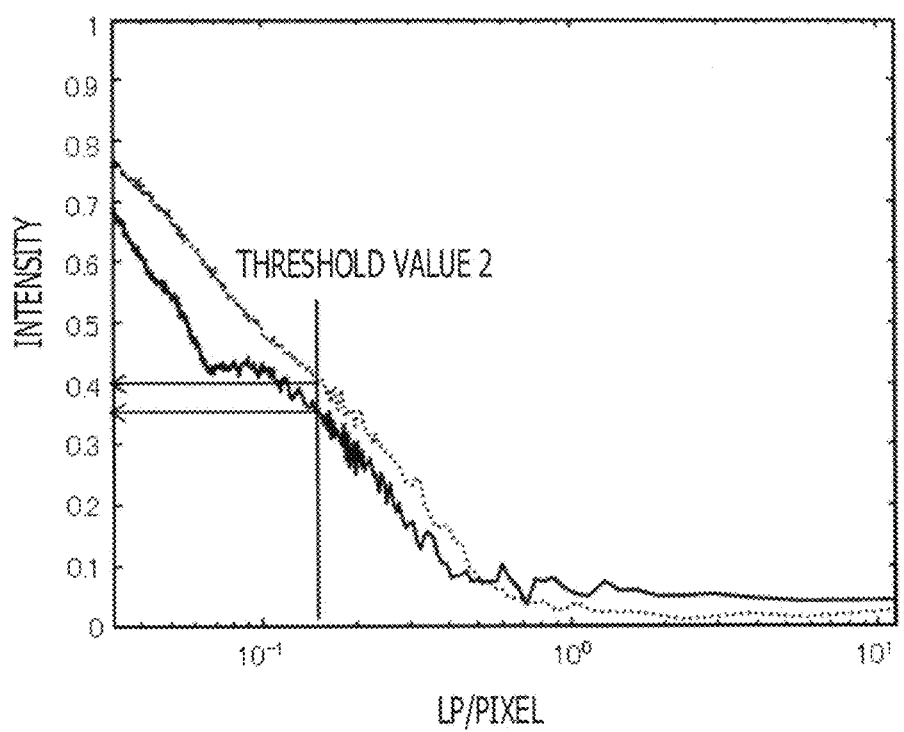
FIG. 28 illustrates an example of weight coefficient determination processing 2.

FIG. 28 illustrates an example of weight coefficient determination processing 2. As illustrated in FIG. 28, the coefficient determining section 123 determines the weight coefficients in such a way that a difference in amplitude intensity becomes small at a predetermined spatial frequency (threshold value 2).

Incidentally, a plurality of threshold values 1 and a plurality of threshold values 2 may be set, and the coefficient determining section 123 may determine the weight coefficients in such a way that the sum of squares of the difference at each threshold value is minimized. It is to be noted that the coefficient determining section 123 may determine the weight coefficients in such a way that a predetermined difference is smaller than or equal to a previously set threshold value. This threshold value only has to be set by a preliminary experiment or the like.

Moreover, the coefficient determining section 123 may determine the weight coefficients in such a way that a difference between the sum of squares of the difference in resolution between two directions in an image central part and the sum of squares of the difference in resolution between two directions in an image peripheral part which is different from the image central part is smaller than or equal to a predetermined value. Furthermore, the coefficient determining section 123 may determine the weight coefficients in such a way that the sum of squares of the difference between the image central part and the image peripheral part is minimized.

The reason is as follows. By making the resolution in the image central part equal to the resolution in the image peripheral part when the anisotropy of resolution is reduced, the resolution of the whole image becomes consistent, which makes it possible to improve image quality.

Minimization determination performed by the coefficient determining section 123 may be performed by calculation using a minimization function or may be performed by a human. As the minimization function, there are, for example, the simplex search method, the steepest-descent method, and the conjugate gradient method.

The filter data determining section 102 adjusts the weight coefficients by changing the weight coefficients, obtains an inverse filter with the adjusted weight coefficients, corrects the image by using the obtained inverse filter, and determines optimum weight coefficients based on the result of the resolution analysis of the corrected image. Until optimum weight coefficients are determined, adjustment of the weight coefficients, calculation of an inverse filter, correction by filtering, and a resolution analysis are repeatedly performed.

The image processing section 4 may be formed of a digital signal processor (DSP), for example. In this case, the RAW memory 41 may be a memory built into the DSP or an external memory. Moreover, the image processing section 4 and the postprocessing section 5, the image memory 8, the coefficient analyzing section 10, the VRAM for display, and the like may be integrated together into a single DSP. Furthermore, the coefficient analyzing section 10 may be formed as a single image processing apparatus or an image processing apparatus including other processing sections.

Alternatively, in place of a processor for particular processing such as a DSP, a general-purpose processor such as a CPU may implement the function of the image processing section 4 and the coefficient analyzing section 10 by executing a predetermined program. Likewise, the drive control apparatus 6, the control apparatus 7, and the postprocessing section 5 may be formed of at least one processor for particular processing or general-purpose processor.

Incidentally, a program that makes a processor function as the image processing section 4 and the coefficient analyzing section 10 and a recording medium that records the program are also included in the embodiment. This recording medium is a non-transitory recording medium and does not include a transitory medium such as a signal itself.

Advantages

Figure 29:
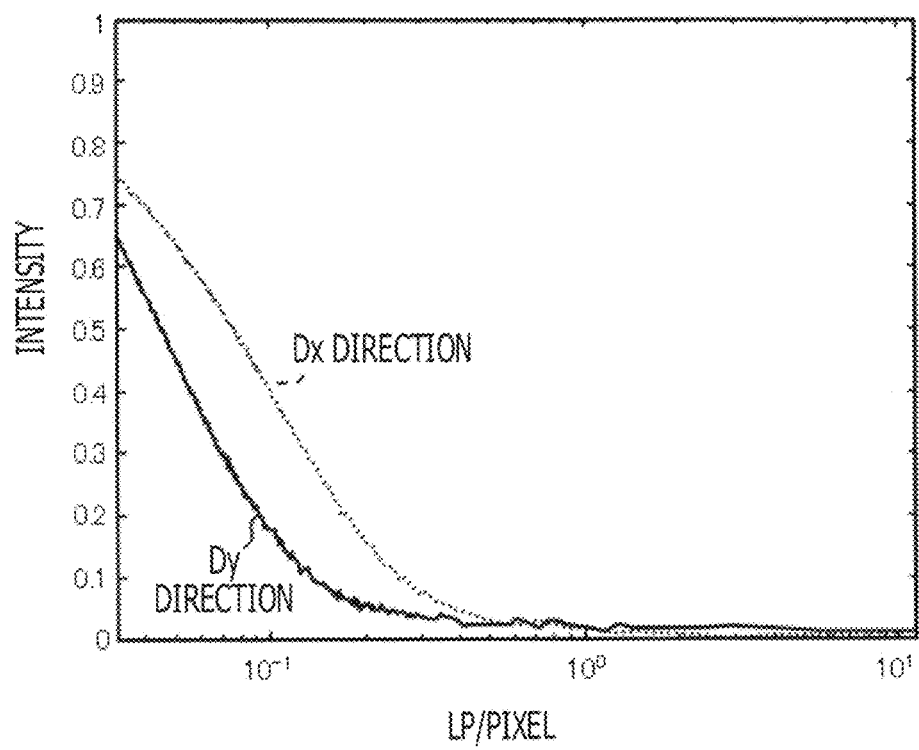
FIG. 29 illustrates the result of an analysis of resolution before image correction.

Next, the advantages of the use of the inverse filter having anisotropy obtained by the coefficient analyzing section 10 will be described. FIG. 29 illustrates the result of an analysis of resolution before image correction. FIG. 29 indicates that the Dy direction exhibits a sharper drop than the Dx direction, which means that the resolution in the Dy direction is reduced as compared to the resolution in the Dx direction.

Figure 30:
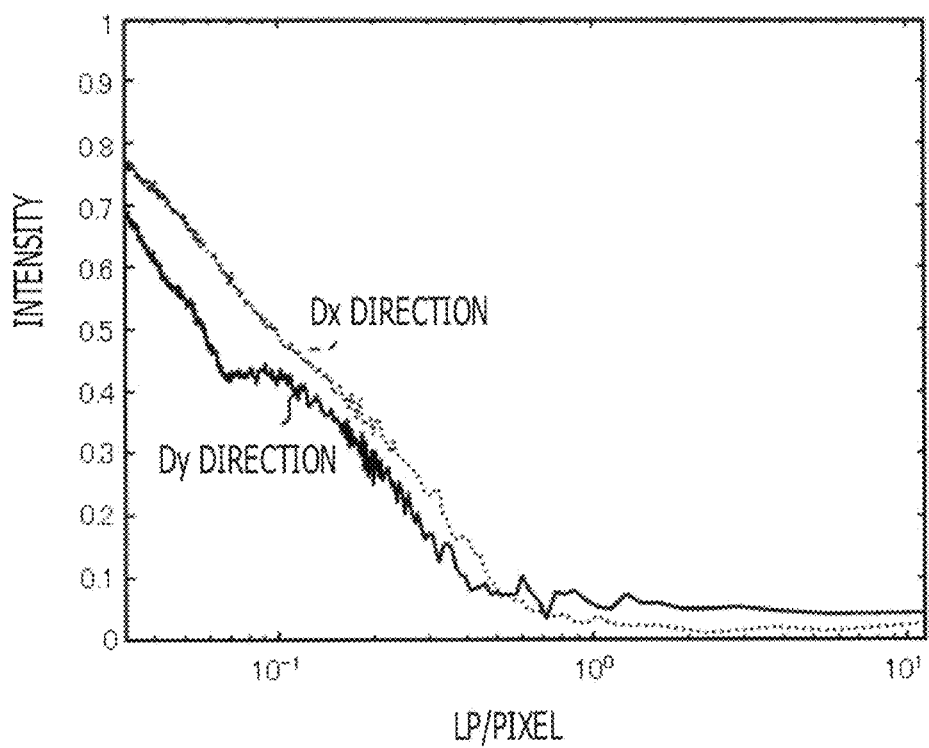
FIG. 30 illustrates the result of an analysis of resolution after image correction in Embodiment 1.

FIG. 30 illustrates the result of an analysis of resolution after image correction in Embodiment 1. In an example illustrated in FIG. 30, $\gamma$ of 1/300 is used. As illustrated in FIG. 30, the resolution is improved in the Dx and Dy directions and a difference between the Dx direction and the Dy direction becomes small. This indicates that it is possible to improve the anisotropy of resolution.

Figure 31:
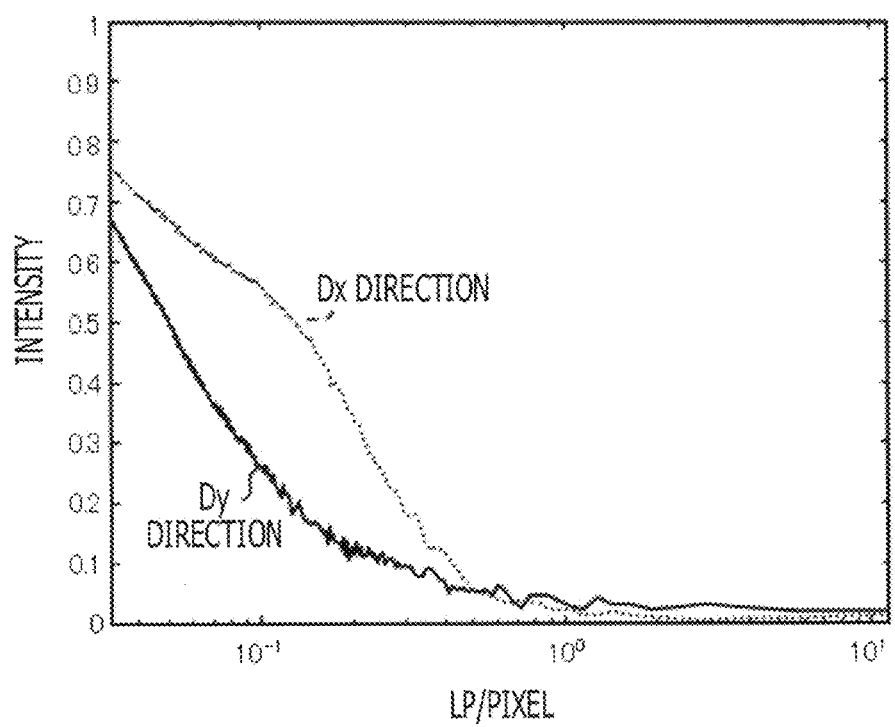
FIG. 31 illustrates the result of an analysis of resolution after image correction when $\gamma=1$.

FIG. 31 illustrates the result of an analysis of resolution after image correction when $\gamma=1$. The result of the analysis illustrated in FIG. 31 is the result obtained when the existing inverse filter is used. As illustrated in FIG. 31, resolution is improved in each direction. However, a difference between the directions becomes large, indicating that it is impossible to improve the anisotropy of resolution.

Operation

Figure 32:
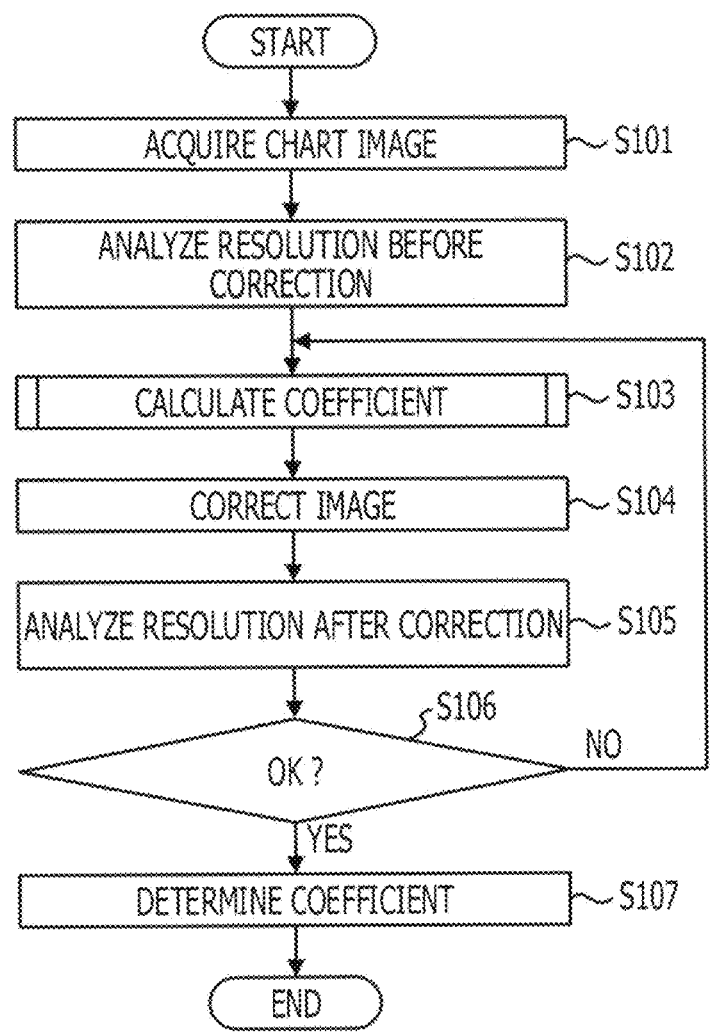
FIG. 32 is a flowchart of an example of weight coefficient determination processing in Embodiment 1.

Next, the operation of image processing in Embodiment 1 will be described. FIG. 32 is a flowchart of an example of weight coefficient determination processing in Embodiment 1. In step S101 in FIG. 32, the coefficient analyzing section 10 acquires a chart image from the RAW memory 41.

In step S102, the resolution analyzing section 101 analyzes the resolution of the image before correction.

In step S103, the filter data determining section 102 calculates a blurring function (for example, a PSF), ellipticity, an angle, and weight coefficients used in an inverse filter. The weight coefficients are, for example, $\epsilon$ and $\gamma$.

In step S104, the image correcting section 122 corrects the image by performing filtering by using the inverse filter by the calculated weight coefficients.

In step S105, the resolution analyzing section 101 analyzes the resolution of the corrected image.

In step S106, the coefficient determining section 123 judges whether or not the weight coefficients meet the condition. If the weight coefficients meet the condition (step S106-YES), the procedure proceeds to step S107; if the weight coefficients do not meet the condition (step S106-NO), the procedure goes back to step S103.

In step S107, the coefficient determining section 123 determines the weight coefficients that meet the condition.

The coefficient analyzing section 10 performs the above processing in each of the positions in the image, each position in which a chart is present. In each position in the image, the coefficient analyzing section 10 analyzes the anisotropy of resolution and determines filter data for improving the anisotropy.

Figure 33:
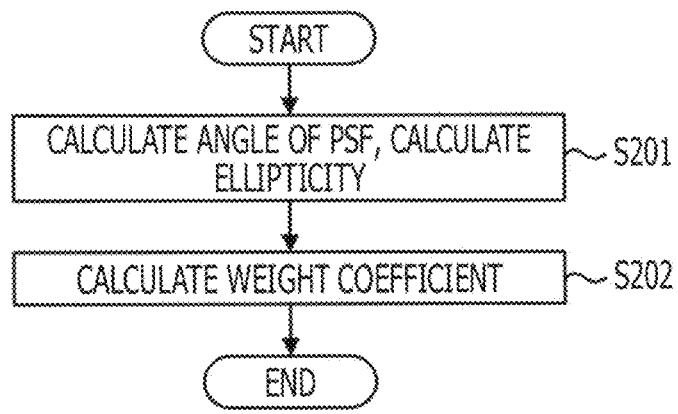
FIG. 33 is a flowchart of an example of coefficient calculation processing.

Next, the coefficient calculation processing in step S103 will be described. FIG. 33 is a flowchart of an example of the coefficient calculation processing. In step S201 in FIG. 33, the filter data determining section 102 calculates an angle θ of a PSF of a blurring function and ellipticity.

In step S202, the filter data determining section 102 calculates weight coefficients. Initial values are provided to a weight coefficient ε (a weight coefficient of the whole) and a weight coefficient γ (a weight coefficient for improving a direction with lower resolution), and the values of the weight coefficients are changed by the adjusting section 121. Incidentally, when it is judged in step S106 that the weight coefficients do not meet the condition and coefficients are calculated again, the filter data determining section 102 may perform only an adjustment of the weight coefficients.

Figure 34:
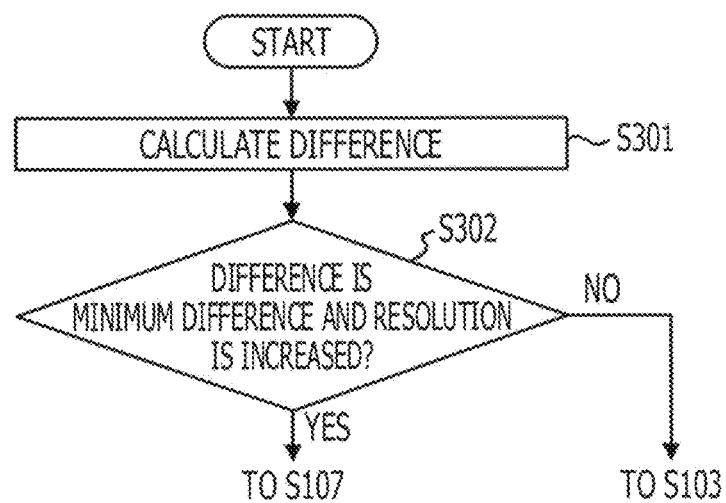
FIG. 34 is a flowchart of an example of condition judgment processing.

Next, the condition judgment processing in step S106 will be described. FIG. 34 is a flowchart of an example of the condition judgment processing. In step S301 in FIG. 34, the coefficient determining section 123 calculates a predetermined difference based on the result of the resolution analysis. As described earlier, the predetermined difference is a difference in spatial frequency between two directions at predetermined amplitude intensity, a difference in amplitude intensity between two directions at a predetermined spatial frequency, or the like. Moreover, the predetermined difference may be a difference between the sum of squares of the difference in spatial frequency between two directions in an image central part and the sum of squares of the difference in spatial frequency between two directions in an image peripheral part.

In step S302, the coefficient determining section 123 determines whether or not the predetermined difference thus calculated is a minimum difference and resolution is increased. If this condition is met (step S302—YES), the procedure proceeds to step S107; if this condition is not met (step S302—NO), the procedure proceeds to step S103.

By performing the above processing, it is possible to determine, for a predetermined image position, filter data that improves the anisotropy of resolution while correcting blurring. For example, it is possible to detect a direction with lower resolution as compared to the other direction and determine weight coefficients that improve the resolution of the direction with lower resolution. When the filter data is determined, the coefficient analyzing section 10 is allowed to determine an inverse filter (see Expression (18)).

Figure 35:
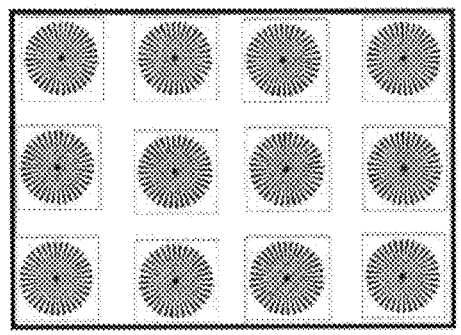
FIG. 35 illustrates an example of an image obtained by taking an image of 12 charts.

The coefficient analyzing section 10 calculates an inverse filter in each position in the image. FIG. 35 illustrates an example of an image obtained by taking an image of 12 charts. The example illustrated in FIG. 35 is a mere example, and the number of charts is not limited to 12. A chart only has to be present in each of a plurality of regions obtained by dividing an image.

The coefficient analyzing section 10 determines filter data in each region in which a chart is present and calculates an inverse filter. The coefficient analyzing section 10 creates a table in which the position of the image is related to the inverse filter.

FIG. 36 illustrates an example of an inverse filter table. In the inverse filter table illustrated in FIG. 36, the coordinates of an upper left pixel in each region is related to the inverse filter calculated based on the chart in that region. For example, an inverse filter (FIL1) is related to a position $(x_1, y_1)$.

This allows the image processing apparatus including the coefficient analyzing section 10 to determine filter data for calculating an inverse filter in which the anisotropy of resolution is improved.

Embodiment 2

Next, an imaging device in Embodiment 2 will be described. In Embodiment 2, a taken image is corrected by using an inverse filter in which the anisotropy of resolution is improved, the inverse filter obtained in Embodiment 1. This makes it possible to provide a high-quality image.

Configuration

Figure 37:
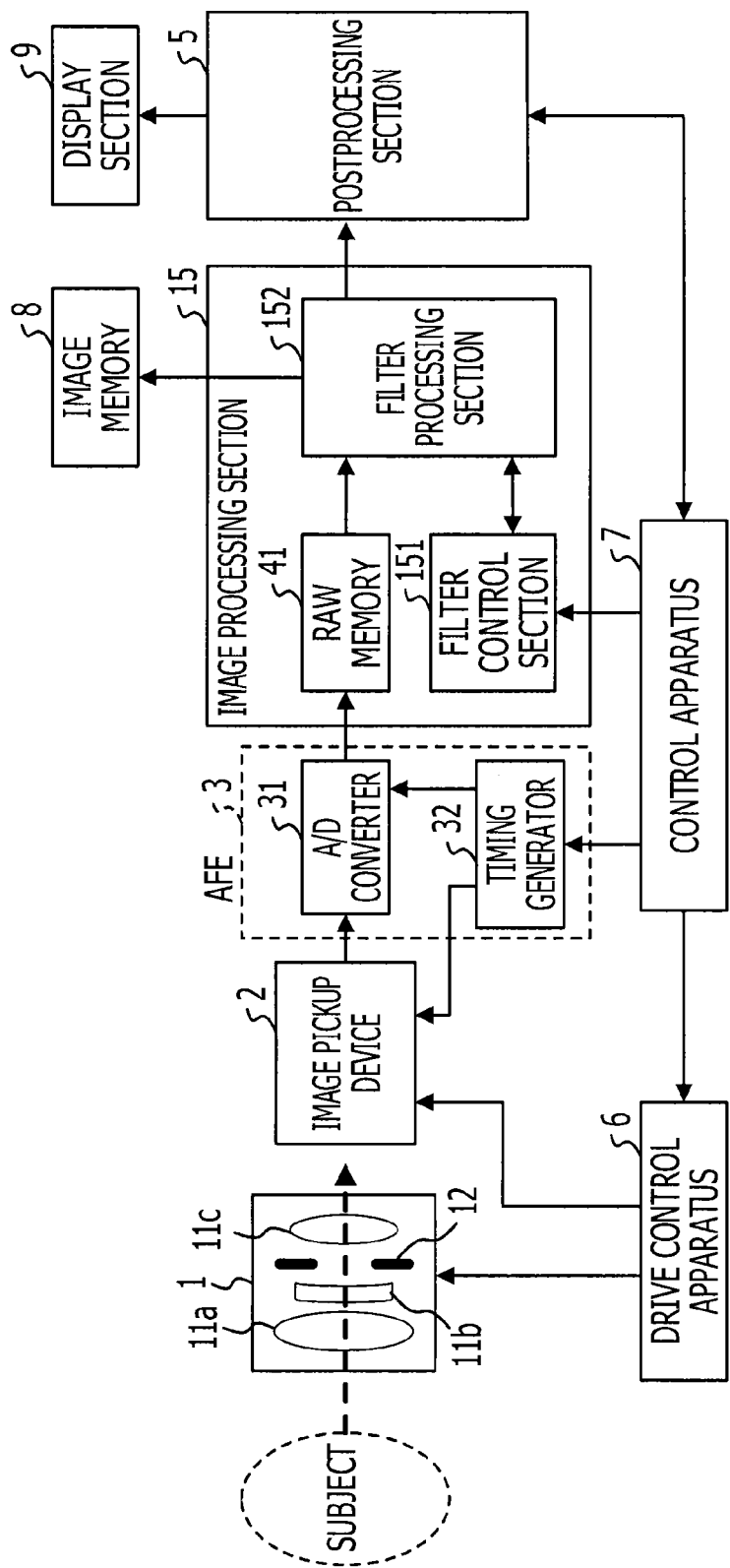
FIG. 37 is a block diagram of an example of a general configuration of an imaging device including an image processing apparatus in Embodiment 2.

FIG. 37 is a block diagram of an example of a general configuration of an imaging device including an image processing apparatus in Embodiment 2. In the configuration illustrated in FIG. 37, such blocks as are configured in the same manner as in Embodiment 1 are identified with the same reference characters. Hereinafter, an image processing section 15 in Embodiment 2 will be mainly described.

The image processing section 15 includes a RAW memory 41, a filter control section 151, and a filter processing section 152. The filter control section 151 retains an inverse filter table created in Embodiment 1. The filter control section 151 specifies an inverse filter corresponding to the position of an image to be processed by referring to the inverse filter table, and outputs the inverse filter to the filter processing section 152. That is, the filter control section 151 outputs, to the filter processing section 152, each inverse filter corresponding to each position in the image to be processed.

The filter processing section 152 performs filtering in a corresponding image position by using the inverse filter acquired from the filter control section 151. This makes it possible to improve image quality while improving the anisotropy of resolution which differs depending on the position in the image.

Here, instead of using one inverse filter for each pixel in each region of the image, the filter processing section 152 may obtain a pixel value of a target pixel by performing linear interpolation by using neighboring inverse filters.

Figure 38:
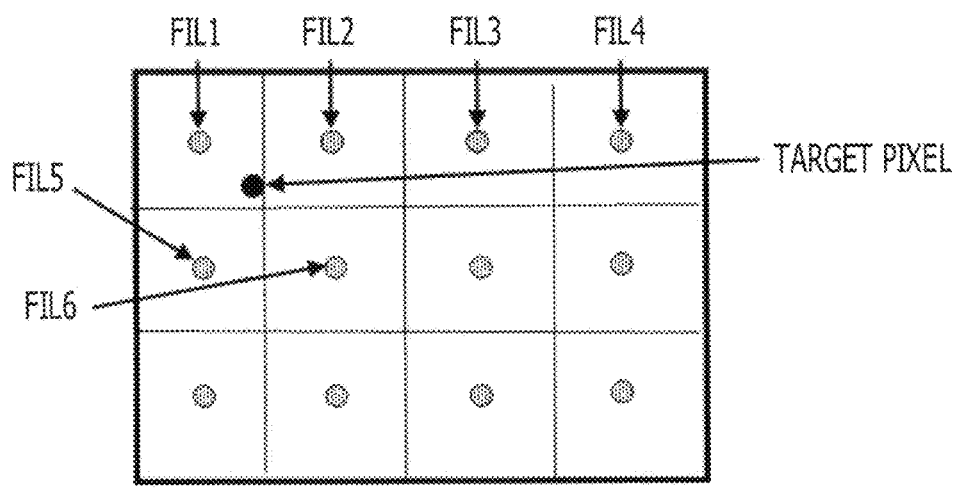
FIG. 38 illustrates linear interpolation of a target pixel.

FIG. 38 illustrates linear interpolation of a target pixel. As illustrated in FIG. 38, the filter processing section 152 may obtain a pixel value of a target pixel by performing linear interpolation in accordance with the distance of each pixel by using a center pixel of each of the regions calculated by four neighboring inverse filters, for example. In an example of FIG. 38, the filter processing section 152 calculates a pixel value of a target pixel by performing linear interpolation of pixel values of the regions obtained by FIL1, FIL2, FIL5, and FIL6.

Moreover, the filter processing section 152 may calculate a pixel value after obtaining an inverse filter itself for a target pixel by linear interpolation. Furthermore, in the above-described example, four neighboring inverse filters are used, but the number of neighboring inverse filters is not limited thereto, and any other number of multiple neighboring inverse filters may be used. In addition, a distance is used as linear interpolation, but interpolation may be performed by other methods. Moreover, interpolation may be performed for each of small regions obtained by subdividing the region into small regions or may be performed for each pixel.

Operation

Figure 39:
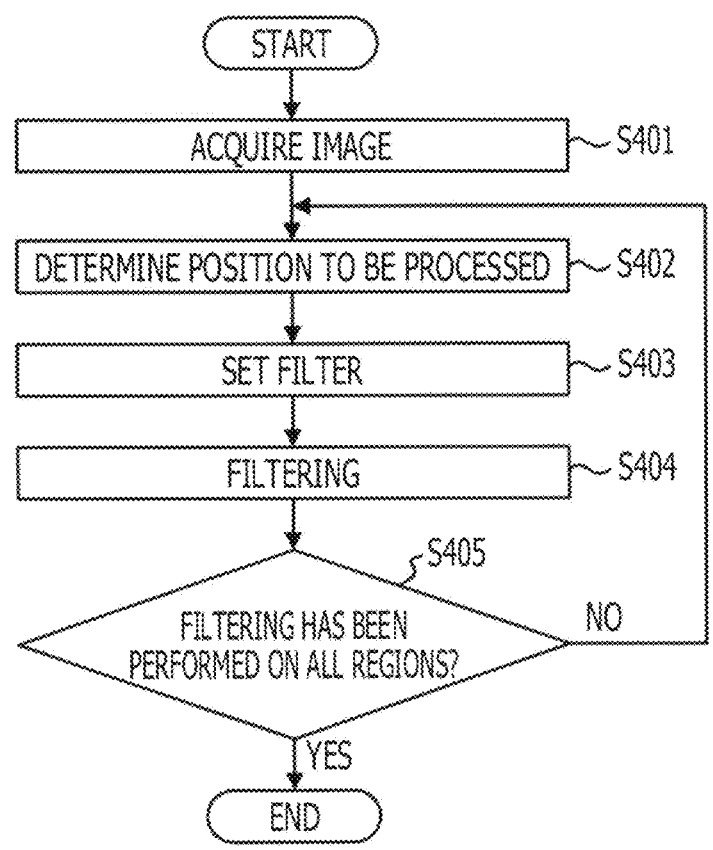
FIG. 39 is a flowchart of an example of filter processing in Embodiment 2.

Next, the operation of the image processing section 15 in Embodiment 2 will be described. FIG. 39 is a flowchart of an example of filter processing in Embodiment 2.

In step S401 in FIG. 39, the filter processing section 152 acquires an image to be processed from the RAW memory 41.

In step S402, the filter processing section 152 determines the position to be processed of the image to be processed and notifies the filter control section 151 of the position. The filter control section 151 specifies an inverse filter corresponding to the position to be processed and notifies the filter processing section 152 of the specified inverse filter.

In step S403, the filter processing section 152 sets the acquired inverse filter in an image in the position to be processed.

In step S404, the filter processing section 152 performs filtering on the image in the position to be processed by using the set inverse filter. Moreover, the filter processing section 152 may obtain a pixel value of a target pixel by performing linear interpolation.

In step S405, the image processing section 15 determines whether or not filtering has been performed on all the regions. If filtering has been performed on all the regions (step S405—YES), the processing is ended; if filtering has not been performed on all the regions (step S405—NO), the procedure goes back to step S402.

As described above, according to Embodiment 2, since it is possible to perform filtering in each position of an image by using a filter in which the anisotropy of resolution is improved, it is possible to provide a high-quality image.

Embodiment 3

Next, an image processing apparatus in Embodiment 3 will be described. In Embodiment 3, a CPU, a DSP, and the like are made to perform the processing of the coefficient analyzing section 10 of Embodiment 1 and the processing of the image processing section 15 of Embodiment 2.

Configuration

Figure 40:
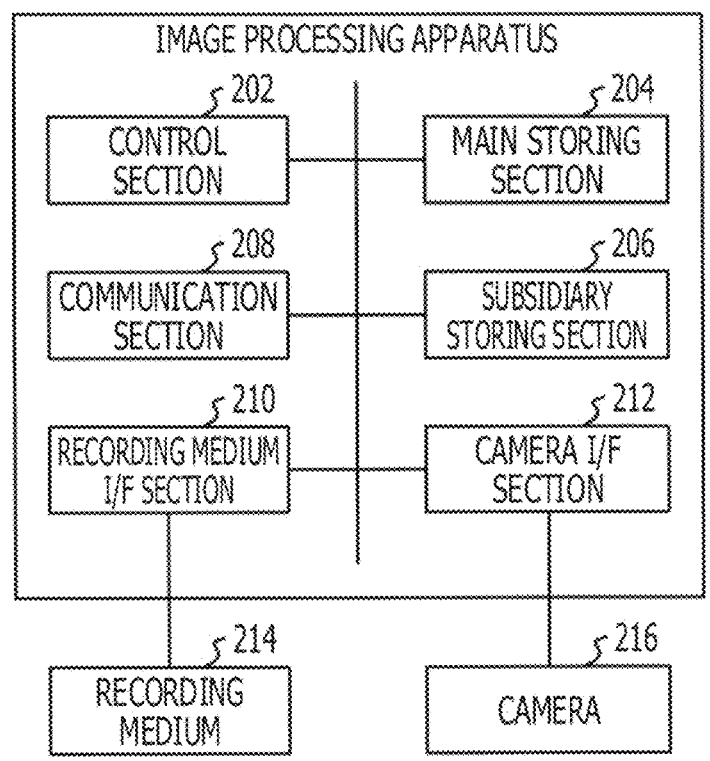
FIG. 40 is a block diagram of an example of a general configuration of an image processing apparatus in Embodiment 3.

FIG. 40 is a block diagram of an example of a general configuration of the image processing apparatus in Embodiment 3. The image processing apparatus illustrated in FIG. 40 includes a control section 202, a main storing section 204, a subsidiary storing section 206, a communication section 208, a recording medium interface (I/F) section 210, and a camera I/F section 212. The individual sections are connected to one another via a bus in such a way that these sections are capable of transmitting and receiving data to and from one another. The image processing apparatus is an apparatus having an information processing function, such as a personal computer (PC), a server, and a tablet device.

The control section 202 is a central processing unit (CPU) or the like that performs control of each device and computations and processing of data in the computer. Moreover, the control section 202 is an arithmetic unit that executes the program stored in the main storing section 204 or the subsidiary storing section 206.

Furthermore, the control section 202 is capable of performing each processing described above by executing the program stored, for example, in the subsidiary storing section 206 for performing the coefficient analysis processing and the filter processing.

The main storing section 204 is a read-only memory (ROM), a random-access memory (RAM), or the like, and is a storage device that stores or temporarily stores a program or data such as an OS which is basic software executed by the control section 202 and application software.

The subsidiary storing section 206 is a hard disk drive (HDD) or the like and is a storage device that stores data related to the application software or the like. Moreover, the subsidiary storing section 206 may store a program for performing the coefficient analysis processing or the filter processing, the program acquired from the recording medium 214 or the like.

The communication section 208 performs wired or wireless communication. The communication section 208 acquires a plurality of images from a server, for example, and stores the images in the subsidiary storing section 206, for example.

The recording medium I/F section 210 is an interface between the recording medium 214 (for example, a flash memory) connected thereto via a data transmission line such as a universal serial bus (USB) and the image processing apparatus.

Moreover, a predetermined program is stored in the recording medium 214, and the program stored in the recording medium 214 is installed in the image processing apparatus via the recording medium I/F section 210. The installed predetermined program is executable by the image processing apparatus.

The camera I/F section 212 is an interface that performs communication with the camera 216. The camera I/F section 212 acquires, from the camera 216, a chart image taken by the camera 216, a normal image to be corrected, and the like and stores these images in the subsidiary storing section 206 or the like.

The camera 216 takes a chart image as illustrated in FIG. 35 and an image of normal scenery, a person, and the like. The taken image is captured in the image processing apparatus via the camera I/F section 212. Incidentally, the camera 216 may be built into the image processing apparatus.

This makes it possible for the image processing apparatus to calculate an inverse filter in each position by acquiring the chart image and correct the image to be corrected by using the calculated inverse filter.

Therefore, by recording a program for implementing the coefficient analysis processing and the filter processing described in the above-mentioned embodiments on a recording medium, it is possible to make the computer perform the coefficient analysis processing and the filter processing in the embodiments.

For example, it is also possible to implement the above-described coefficient analysis processing and filter processing by recording this program on a recording medium and making a computer, a portable terminal, a smartphone, a tablet device, and the like read the recording medium on which the program is recorded.

Incidentally, as the recording medium, it is possible to use various types of recording media such as a recording medium that optically, electrically, or magnetically records information, such as a CD-ROM, a flexible disk, and a magneto-optical disk, and a semiconductor memory that electrically records information, such as a ROM and a flash memory. Moreover, the recording medium does not include a transitory recording medium such as a carrier wave.

Figure 41:
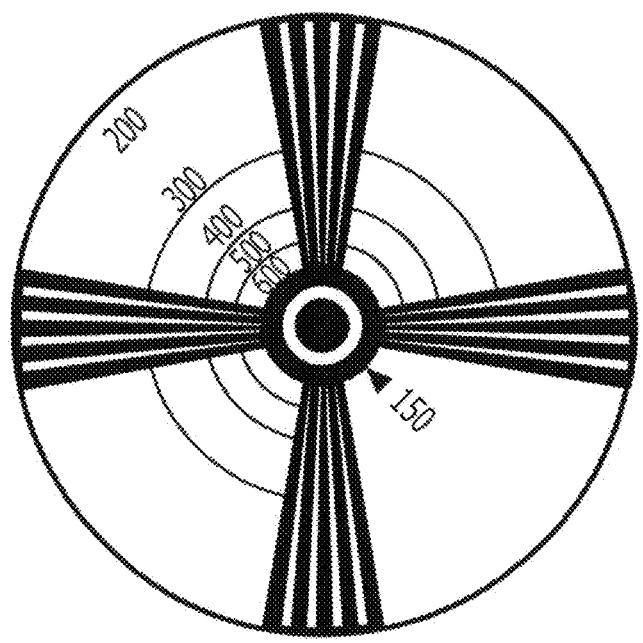
FIG. 41 illustrates an example of a chart (I)
Figure 42:
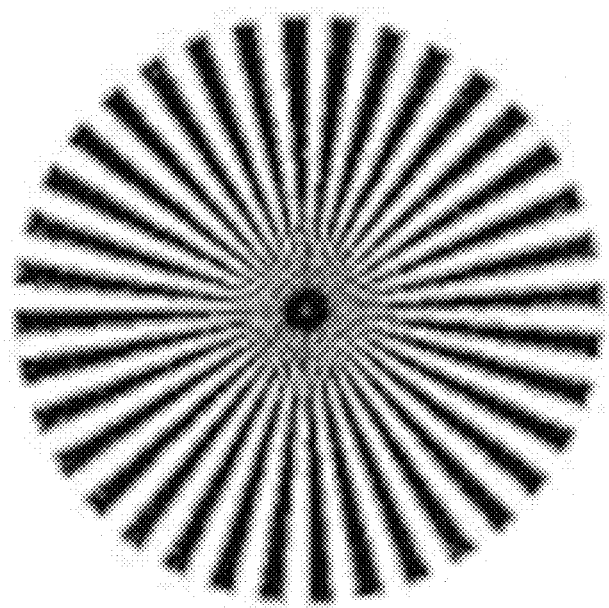
FIG. 42 illustrates an example of a chart (II)
Figure 43:
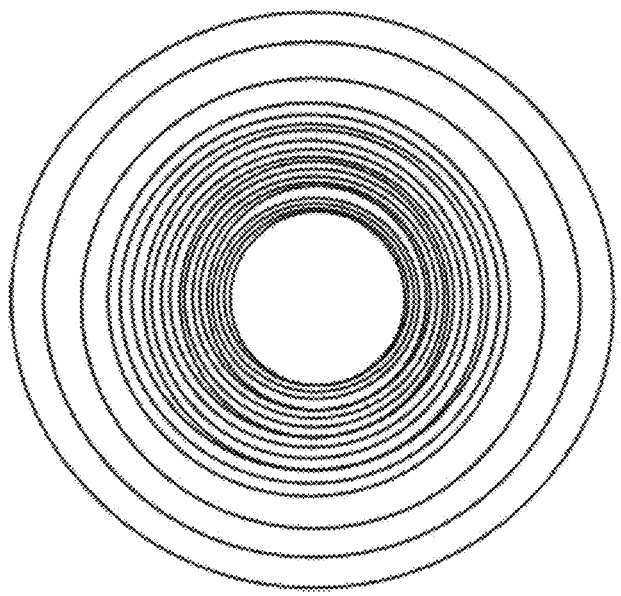
FIG. 43 illustrates an example of a chart (III).

Moreover, as examples of a chart, charts of FIGS. 41 to 43 may be used. FIG. 41 illustrates an example of a chart (I). The chart illustrated in FIG. 41 is a chart that makes a resolution analysis possible in at least two directions.

FIG. 42 illustrates an example of a chart (II). The chart illustrated in FIG. 42 is a chart that makes a resolution analysis possible in a radial fashion in all directions. The chart illustrated in FIG. 42 is suitable for a resolution analysis.

FIG. 43 illustrates an example of a chart (III). The chart illustrated in FIG. 43 is a chart in which the resolution in a central part is different from the resolution in an outer part. The chart illustrated in FIG. 42 is suitable for a resolution analysis of the embodiments, but it is also possible to analyze the anisotropy of resolution with the charts illustrated in FIGS. 41 and 43.

With the present technique, it is possible to determine filter data that improves the anisotropy of resolution while correcting blurring.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus, comprising:
a processor coupled to a memory, configured to:
perform an analysis of resolution in at least two directions of an image which is taken from a subject having a radial pattern, and
determine filter data containing an adjusted weight coefficient which is obtained by adjusting a weight coefficient in one of the two directions, whichever has lower resolution, based on a result of the analysis of the image corrected by filtering on the image in accordance with a blurring function of the image.

2. The image processing apparatus according to claim 1, wherein
the processor is configured to detect the one of the two directions by rotating horizontal and vertical differential directions of the image.

3. The image processing apparatus according to claim 1, wherein
the processor is configured to adjust the weight coefficient in the one of the two directions so that the resolution in the one of the two directions is improved as compared to the resolution in the other of the two directions.

4. The image processing apparatus according to claim 1, wherein
the processor is configured to:
adjust the weight coefficient in the one of the two directions,
correct the image by filtering the image by using the adjusted weight coefficient, and
determine the adjusted weight coefficient to be contained in the filter data based on a result of the analysis of the corrected image.

5. The image processing apparatus according to claim 4, wherein
the processor is configured to determine the adjusted weight coefficient to be contained in the filter data so that a difference in resolution between the two directions is minimized.

6. The image processing apparatus according to claim 4, wherein
the processor is configured to determine the adjusted weight coefficient to be contained in the filter data so that a difference between a first sum and a second sum is smaller than or equal to a given value, the first sum being a sum of squares of a difference in resolution between the two directions in a central part of the image, and the second sum being a sum of squares of the difference in resolution between the two directions in a peripheral part of the image.

7. The image processing apparatus according to claim 1, wherein
the processor is configured to:
perform the analysis in each of regions obtained by dividing the image, and
determine the adjusted weight coefficient to be contained in the filter data in each of the regions.

8. The image processing apparatus according to claim 1, wherein
the processor is configured to perform filtering on one region in the image by using the filter data containing the adjusted weight coefficient determined for another region of the image, the filter data depending on a position of each of regions in the image.

9. An image processing method, comprising:
performing an analysis of resolution in at least two directions of an image which is taken from a subject having a radial pattern; and
determining, with a processor, filter data containing an adjusted weight coefficient which is obtained by adjusting a weight coefficient in one of the two directions, whichever has lower resolution, based on a result of the analysis of the image corrected by filtering on the image in accordance with a blurring function of the image.

10. The image processing method according to claim 9, wherein
the determining includes detecting the one of the two directions by rotating horizontal and vertical differential directions of the image.

11. The image processing method according to claim 9, wherein
the determining includes adjusting the weight coefficient in the one of the two directions so that the resolution in the one of the two directions is improved as compared to the resolution in the other of the two directions.

12. The image processing method according to claim 9, wherein
the determining includes:
adjusting the weight coefficient in the one of the two directions,
correcting the image by filtering the image by using the adjusted weight coefficient, and
determining the adjusted weight coefficient to be contained in the filter data based on a result of the analysis of the corrected image.

13. The image processing method according to claim 12, wherein
the determining the adjusted weight coefficient to be contained in the filter data includes determining so that a difference in resolution between the two directions is minimized.

14. The image processing method according to claim 12, wherein
the determining the adjusted weight coefficient determining so that a difference between a first sum and a second sum is smaller than or equal to a given value, the first sum being a sum of squares of a difference in resolution between the two directions in a central part of the image, and the second sum being a sum of squares of the difference in resolution between the two directions in a peripheral part of the image.

15. The image processing method according to claim 9, wherein
the performing includes perform the analysis in each of regions obtained by dividing the image, and
the determining the adjusted weight coefficient data includes determining the adjusted weight coefficient in each of the regions.

16. The image processing method according to claim 9, further comprising:
performing filtering on one region in the image by using the filter data containing the adjusted weight coefficient determined for another region of the image, the filter data depending on a position of each of regions in the image.

17. An imaging device, comprising:

a processor coupled to a memory, the processor configured to:
- perform an analysis of resolution in at least two directions of an image which is taken from a subject having a radial pattern, and
- determine filter data containing an adjusted weight coefficient which is obtained by adjusting a weight coefficient in one of the two directions, whichever has lower resolution, based on a result of the analysis of the image corrected by filtering on the image in accordance with a blurring function of the image; and a display configured to display the image processed by the processor.

* * * * *